(12) United States Patent
Sbardella

(10) Patent No.: US 9,696,562 B2
(45) Date of Patent: Jul. 4, 2017

(54) EYEGLASSES FRAME

(71) Applicant: IDEAL SRL, Quero (Belluno) (IT)

(72) Inventor: Belinda Sbardella, Valdobbiadene (IT)

(73) Assignee: IDEAL SRL, Quero (Belluno) (IT)

( * ) Notice: Subject to any disclaimer, the term of this patent is extended or adjusted under 35 U.S.C. 154(b) by 0 days.

(21) Appl. No.: 14/895,234

(22) PCT Filed: May 30, 2014

(86) PCT No.: PCT/IB2014/061844
§ 371 (c)(1),
(2) Date: Dec. 2, 2015

(87) PCT Pub. No.: WO2014/195839
PCT Pub. Date: Dec. 11, 2014

(65) Prior Publication Data
US 2016/0116761 A1 Apr. 28, 2016

(30) Foreign Application Priority Data
Jun. 3, 2013 (IT) .............................. TV2013A0089

(51) Int. Cl.
G02C 5/22 (2006.01)
G02C 5/00 (2006.01)

(52) U.S. Cl.
CPC ........... *G02C 5/2281* (2013.01); *G02C 5/008* (2013.01); *G02C 5/2245* (2013.01); *G02C 2200/06* (2013.01); *G02C 2200/20* (2013.01); *G02C 2200/26* (2013.01)

(58) Field of Classification Search
CPC ...... G02C 5/22; G02C 5/2209; G02C 5/2227; G02C 5/2236; G02C 5/2245; G02C 5/2281; G02C 2200/06

USPC ............................................ 351/153; 16/228
See application file for complete search history.

(56) References Cited

U.S. PATENT DOCUMENTS

| 1,578,528 A * | 3/1926 | Kohler ................. G02C 5/22 351/121 |
| 5,444,502 A | 8/1995 | Hyoi |
| 5,793,464 A | 8/1998 | Chen |

FOREIGN PATENT DOCUMENTS

| DE | 1983801 U | 4/1968 |
| DE | 4219039 A1 | 12/1993 |
| EP | 1666952 A2 | 6/2006 |
| WO | 2007007186 A1 | 1/2007 |
| WO | 2010094480 A1 | 8/2010 |

OTHER PUBLICATIONS

PCT International Search Report and Written Opinion dated Oct. 17, 2014 for PCT/IB2014/061844, from which the instant application is based, 8 pgs.

* cited by examiner

*Primary Examiner* — Huy K Mai
(74) *Attorney, Agent, or Firm* — Fredrickson & Byron, P.A.

(57) ABSTRACT

The present invention relates to a frame for spectacles 10 which comprises a front piece 12 and at least one side arm 13 which are hinged together by means of a hinge structure 14. The hinge structure 14 comprises a first hinge part 15 and a second hinge part 16 which are pivotably joined together by means of a pivoting screw 21. In accordance with the invention, the second hinge part 16 comprises a reinforcing element 23 with a fixing base 24 which is fixed inside a locking groove 26 by means of a form-fit joint.

12 Claims, 27 Drawing Sheets

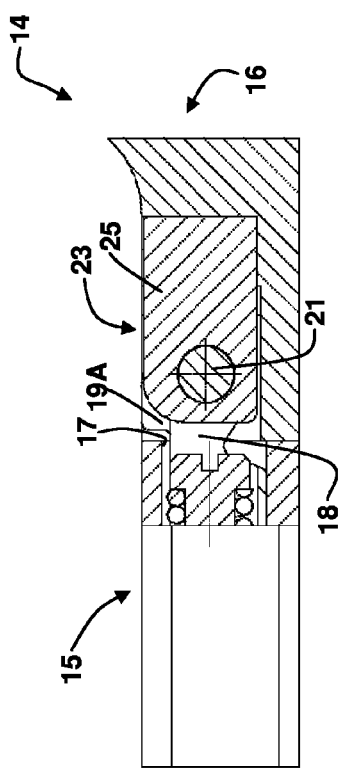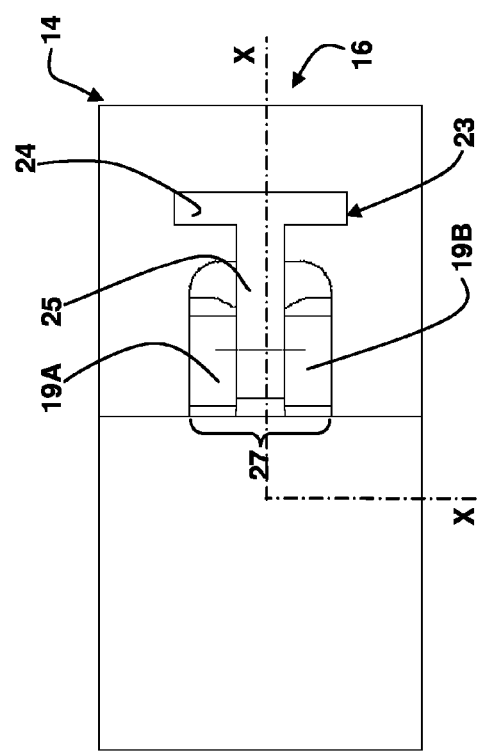
Fig. 10
Fig. 9

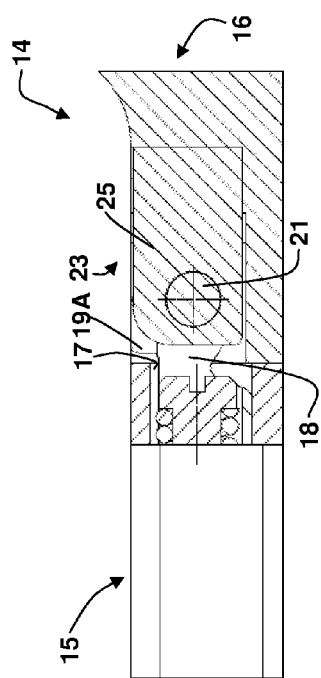
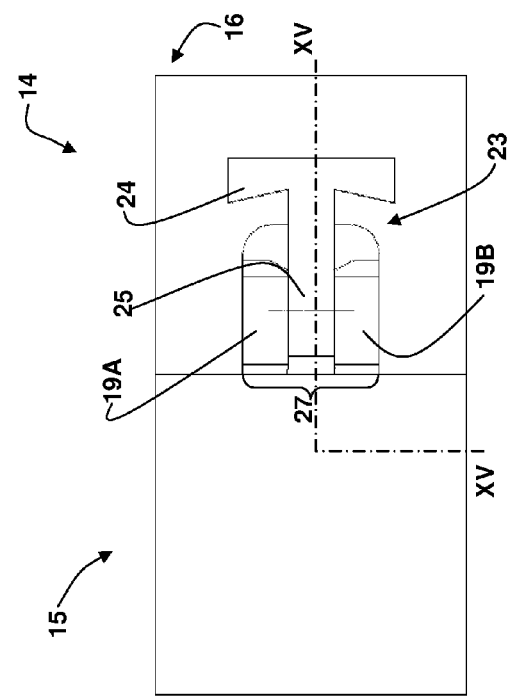

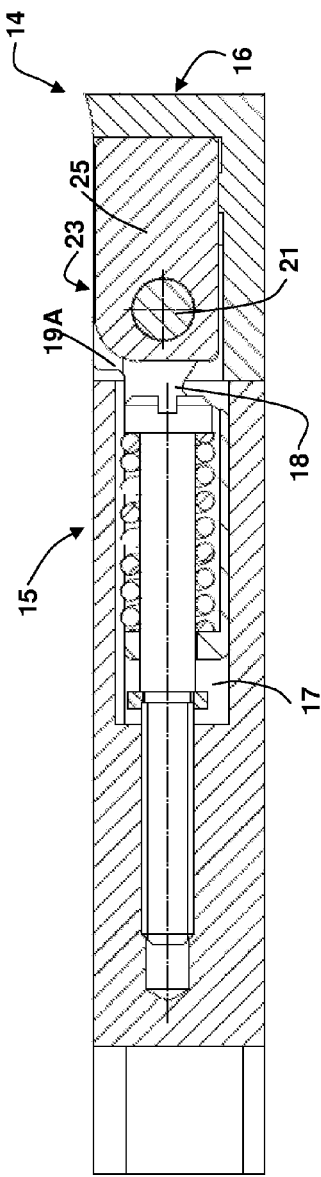
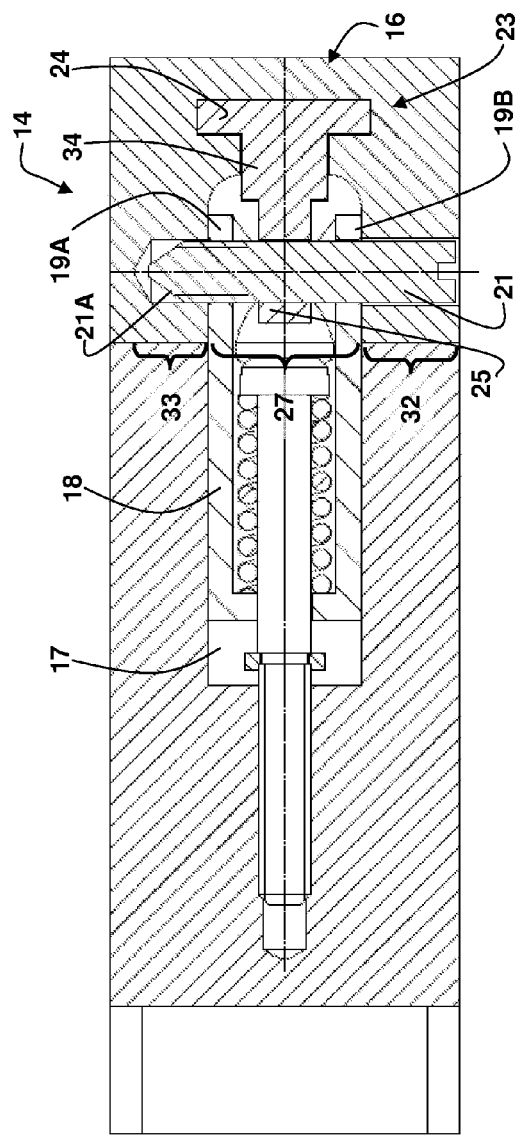
Fig. 21
Fig. 20

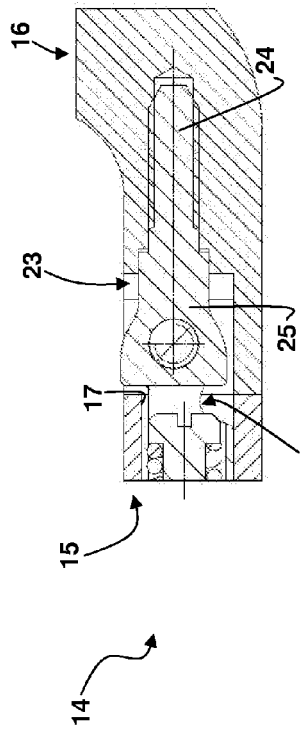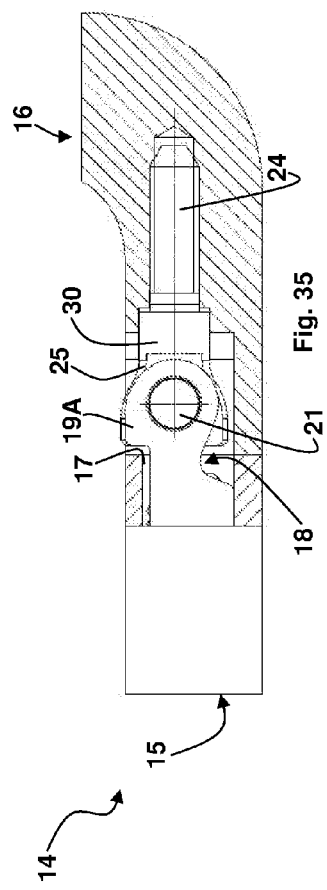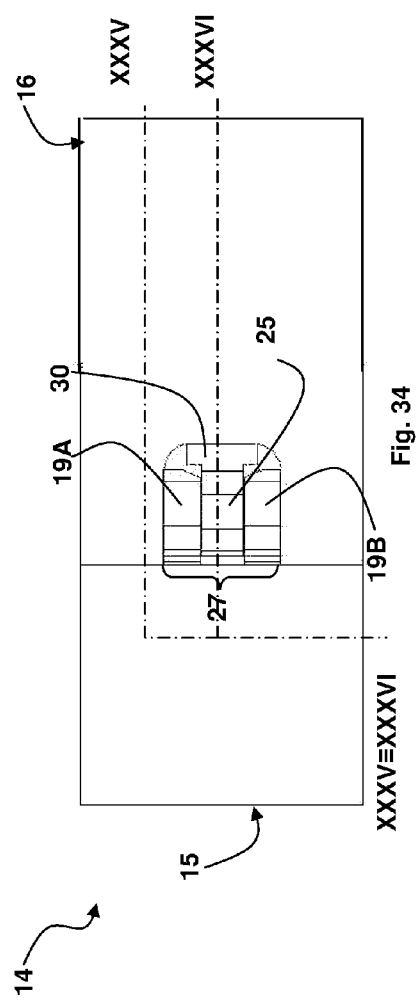

EYEGLASSES FRAME

RELATED APPLICATIONS

This application is a 35 U.S.C. 371 national stage filing from International Application No. PCT/IB2014/061844, filed May 30, 2014, which claims priority to Italian Application No. TV2013A000089, filed Jun. 3, 2013, the teachings of which are incorporated herein by reference.

The present invention relates to a frame for spectacles having a front piece or the side arms provided with a reinforcing insert.

It is known to use hinges for hingeably joining together the front piece and the side arms of a frame for spectacles.

There exist various types of hinges for spectacles and, among such hinges, spring hinges are particularly widespread.

Said spring hinges, which are also called "flex hinges", allow the side arms of the frame to be bent by more than the usual amount without suffering any damage. Said hinges generally comprise two parts which are pivotally joined together and respectively associated with the front piece and the one of the two side arms of the frame.

The part of the hinge associated with the side arm generally comprises an articulation piece which is slidable against the action of a spring and is positioned inside a housing fixed to one end of the side arm.

Recently, for aesthetic reasons, a type of flex hinge, referred to as "hidden" or "concealable" and suitable for being used advantageously in combination with frames made of polymer material, has been developed.

In such type of hinges, the slidable articulation piece is positioned inside a first seat, which is suitably shaped and formed directly inside the side arm.

In a particular embodiment of hidden flex hinges, the hinge part associated with the front piece consists of a second seat, which is also formed directly inside the front piece of the spectacles. A detail of this type of hinge is schematically shown in the attached FIG. 1A of the present description. This figure is provided in order to illustrate more clearly the technical problem which is faced and solved by the present invention. As mentioned, and with specific reference now to FIG. 1A, the second seat B of the hinge, which is formed inside the front piece, is shaped so as to be able to house and allow the pivoting of the holed end A of the articulation piece which protrudes from the first seat. At least one of the surfaces which delimit the second seat B is holed and the hole B1 of said surface is designed, once assembly of the hinge has been completed, to be aligned with the hole A1 provided in the end of the articulation piece, so as to define a pivoting seat. This seat is designed to be engaged by a pivoting screw C, the axis of which defines essentially the pivoting axis of the two hinge parts.

The pivoting screw C, which is generally of the self-tapping type, after being engaged in succession inside the hole B1 of the seat formed in the front piece and the hole A1 formed in the end of the articulation piece, is screwed directly into the polymer which forms the surface of the seat provided in the front piece opposite the holed surface. In this way, the hinge is rigidly fixed to the frame and allows the side arm and the front piece to be articulated together.

This type of "hidden" flex hinge, although widely used, is not however without certain defects.

Recently it has been noted, in fact, how the seat housing the end of the articulation piece formed in the front piece and inside which the hinge pivoting screw is fixed, may in the long run be subject to breakages due to fatigue in the encircled zone indicated by the reference letter D in FIG. 1A. Still with reference to FIG. 1A, the reference letter E indicates the fissure which causes breakage, due to fatigue, of the part B.

This drawback occurs most frequently in the case of polymer-material frames which are made by means of milling, shearing and/or plastic deformation, such as for example cellulose acetate frames, compared to frames made by means of cast moulding or injection moulding. Cellulose acetate, in fact, although being regarded as being a superior material in the production of frames compared to the materials used in moulding processes, has a lower resistance to shearing and bending stresses, such as those which are exerted by the pivoting screw of the hinge during opening and closing of the side arm.

Moreover, the increasingly pressing demands of an aesthetic nature, aimed at a reduction in the overall dimensions and weights of the frame, have resulted in a reduction in the resistant cross-sections of the surfaces which delimit the seat in the front piece and in some cases have contributed to weakening the seat, further lowering the resistance to shearing and bending stresses.

In the case of frames made by means of injection moulding or casting, such as nylon frames, it is known to apply reinforcing inserts made of metallic material to the seat of the hinge formed in the front piece. These reinforcing inserts may be arranged directly inside the mould before the injection step, so as to be "embedded", once moulding has been completed, inside the material forming the frame. Alternatively, said reinforcing inserts may be fixed to the front piece by means of fixing screws or rivets. This solution is already known from FR 1511263, even though the technical solution described in this patent does not describe a flex hinge of the hidden type.

The provision of these reinforcing inserts reduces considerably the risk of breakages affecting the frame. Said inserts, in fact, are designed to be engaged by the pivoting screw of the hinge and have one or more threaded holes, the axis of which coincides with the hole of the articulation piece. Therefore, once the hinge has been assembled, the pivoting screw of the hinge is screwed into the reinforcing insert and no longer directly into the polymer material forming the frame, thereby reducing the risk that breakages may occur.

However, the provision of these inserts results in an increase in the production costs of the frame. In the case where the inserts are arranged directly inside the mould, the latter must be suitably shaped and provided with special fixing systems able to keep the said inserts in position, during injection, which is performed at high pressures. In the case of fixing by means of screws or rivets, irrespective as to whether the reinforcing insert is arranged in the front piece or in the side arms, the frame must undergo at least two additional machining operations: a first boring operation, in order to provide the seats where the screws or fixing rivets must be fixed, and a second fixing operation, where the insert is first inserted inside its seat and is then fixed, by means of the screws or rivets, to the front piece (or to the side arms) of the frame.

In the case of cellulose acetate frames made, as mentioned above, by means of milling, shearing and subsequent plastic deformation of sheets of suitable thickness, it is not possible to apply the reinforcing inserts directly during the frame machining step.

The solution of subsequently fixing the insert by means of screws, in the case of acetate frames, is also not easy. It involves, in fact, the provision of suitable seats for fixing the screws, with the result that, if on the one hand the pivoting screw of the hinge may be fixed inside the reinforcing insert, on the other hand there is a weakening of the surfaces which delimit the seat for housing the articulation piece.

Moreover, also in the case of acetate frames, the operation of fixing the reinforcing insert to the frame results in an increase in the production costs of the frame itself.

Finally, it has been noted how also non-flex hinges, i.e. hinges provided with an articulation piece rigidly connected to the side arm or to the front piece of the frame, are subject in the long run to the same type of breakage in the region of the pivoting screw of the hinge.

The object of the present invention is therefore that of overcoming at least partially the drawbacks mentioned above with reference to the prior art.

In particular, one aim of the present invention is to provide a frame for spectacles with a hinge which has increased strength, in particular which is less prone to the risk of breakage due to mechanical shearing or bending stressing.

Moreover, one aim of the present invention is to provide a frame for spectacles with a hinge which is strong, but which is easy and relatively inexpensive to manufacture.

Furthermore, one aim of the present invention is to provide a frame for spectacles with a hinge which has an attractive appearance.

Finally, one aim of the present invention is to provide a frame for spectacles with a hinge which has excellent performance features and which may be assembled without having to use specialized labour and/or special equipment.

These and other objects and aims are achieved with a frame provided with a spring hinge according to claim 1 and with a frame provided with a non-spring hinge according to claim 11.

The characteristic features and further advantages of the invention will emerge from the description, provided hereinbelow, of a number of examples of embodiment, provided by way of a non-limiting example, with reference to the accompanying drawings in which:

FIG. 1A shows a schematic view of a detail of a known frame for spectacles;

FIG. 9 shows a view, on a larger scale, of a detail of the frame shown in FIG. 8;

FIG. 10 shows a cross-sectional view of the detail shown in FIG. 9 taken along the plane indicated by the line X-X in FIG. 9;

FIG. 14 shows a view, on a larger scale, of a detail of the frame shown in FIG. 13;

FIG. 15 shows a cross-sectional view of the detail shown in FIG. 14 taken along the plane indicated by the line XV-XV in FIG. 14;

FIG. 20 shows a partially cross-sectional view, on a larger scale, of a detail of the frame shown in FIG. 18;

FIG. 21 shows a view, similar to that of FIG. 20, but taken from a different angle;

FIG. 34 shows a view, on a larger scale, of a detail of the frame shown in FIG. 33;

FIG. 35 shows a cross-sectional view of the detail shown in FIG. 34 along the plane indicated by XXXV-XXXV in FIG. 34;

FIG. 36 shows a cross-sectional view of the detail shown in FIG. 34 along the plane indicated by XXXVI-XXXVI in FIG. 34;

Figure 1:
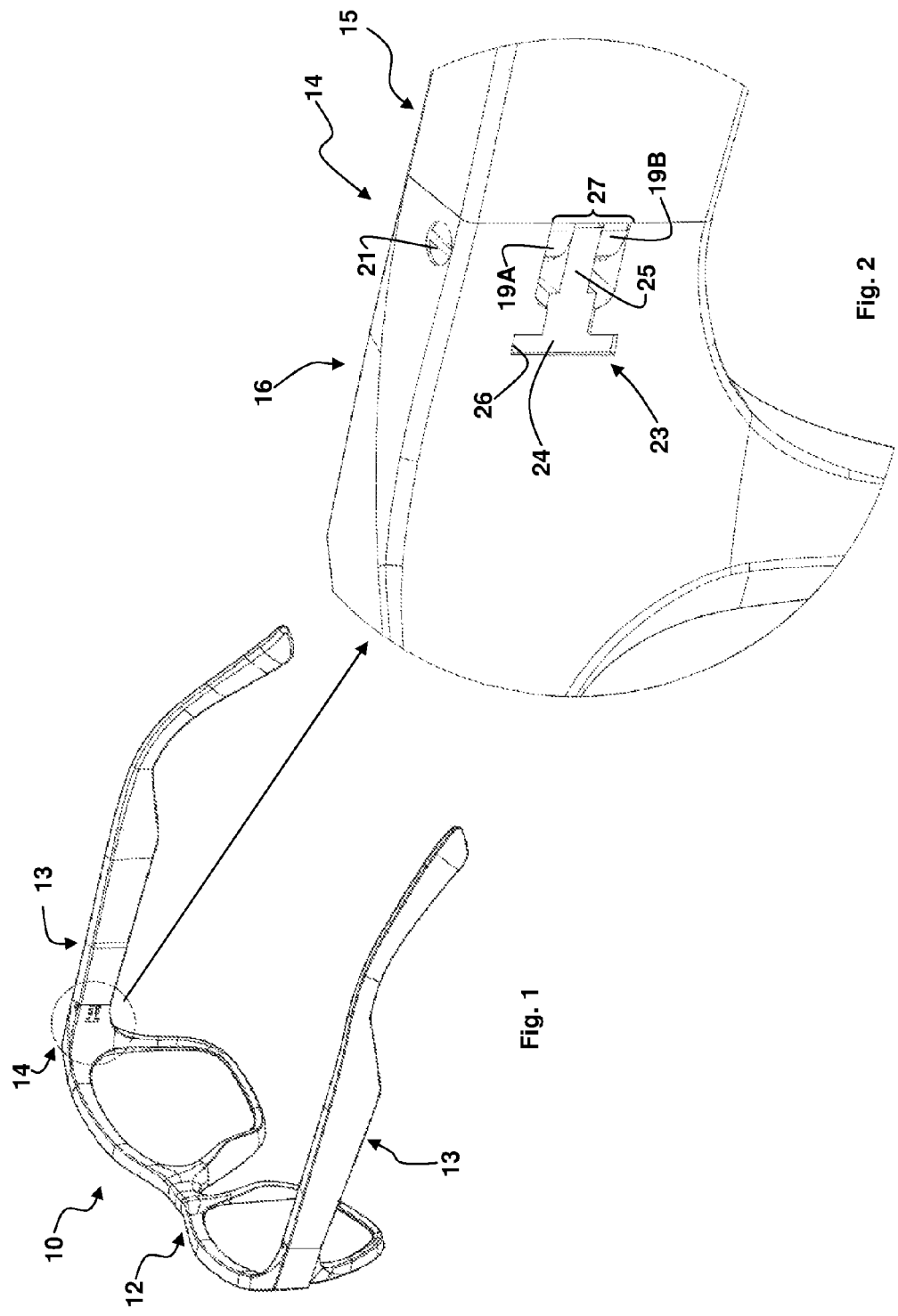
FIG. 1 shows a perspective view of a frame for spectacles according to the invention.

With reference to the figures, FIG. 1 shows a first frame for spectacles—indicated generically by 10—which is provided in accordance with the principles of the present invention.

Figure 2:
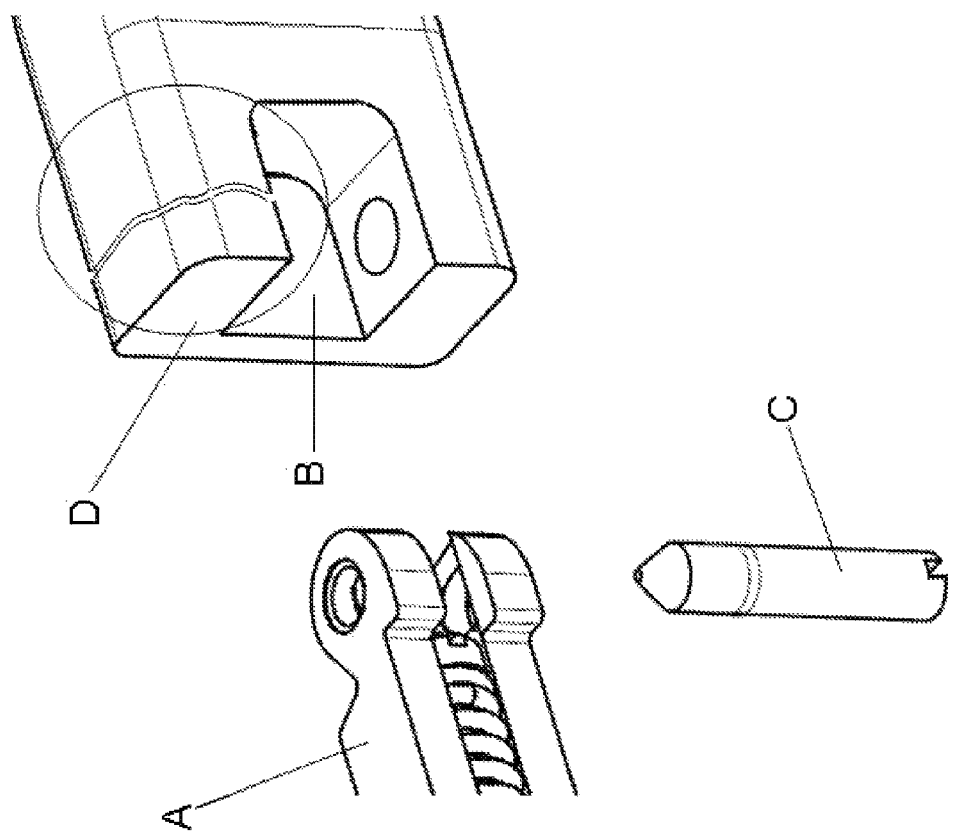
FIG. 2 shows a view, on a larger scale, of the detail of the frame shown encircled in FIG. 1.

The frame 10 comprises a front piece 12 and at least one side arm 13 which are hinged together by means of a hinge structure 14 (see FIG. 2).

Figure 3:
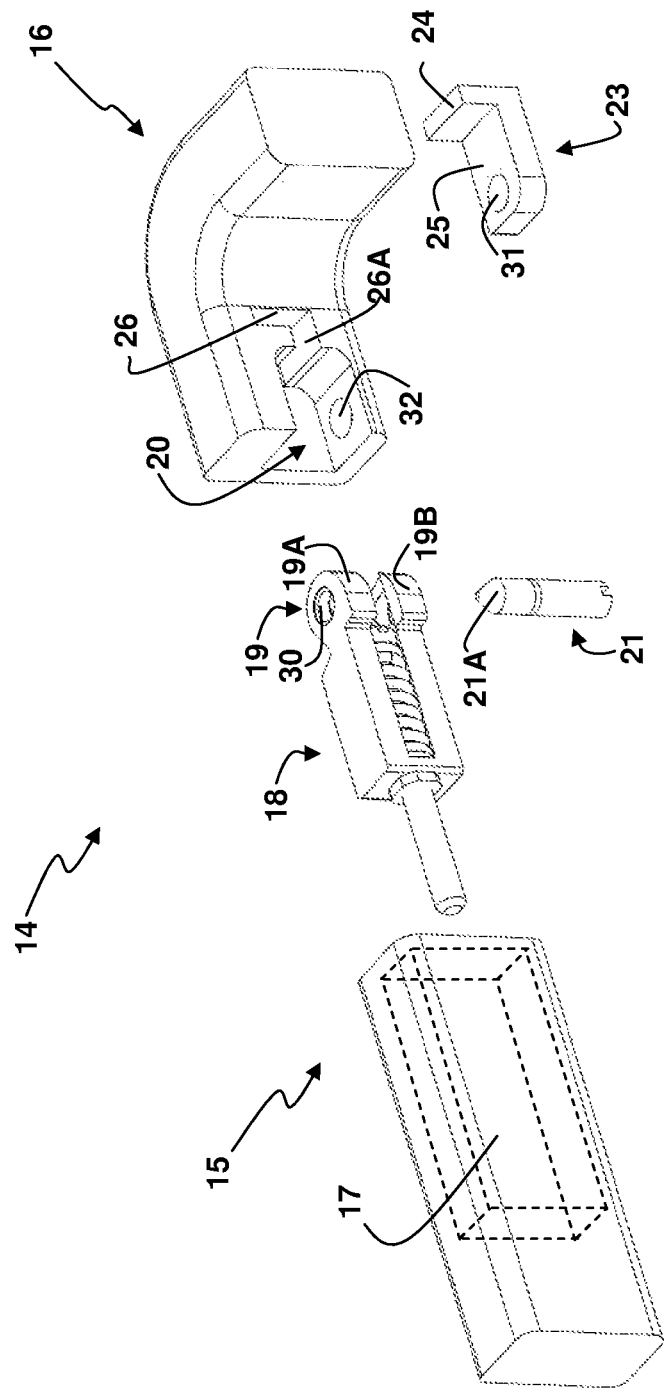
FIG. 3 shows an exploded view of a detail of a first embodiment of a frame according to the invention.

With reference to FIG. 3, in which a first embodiment of the frame according to the invention is shown, the hinge structure 14 comprises a first hinge part 15 and a second hinge part 16. The first hinge part 15 is provided with a cavity 17—shown in broken lines—which slidably houses an articulation piece 18 with a pivoting end 19 defined by at least one holed lug 19A, 19B. The articulation piece 18 will not be described in detail since it is per se known in the art and may be easily imagined by the person skilled in the art.

The second hinge part 16 comprises in turn a housing seat 20 which houses the pivoting end 19 of the articulation piece 18.

As shown in the attached figures, the first hinge part 15 and the second hinge part 16 are provided on end portions of the front piece 12 and the side arm 13 facing each other The frame 10 comprises a reinforcing element 23 having a fixing base 24 from which at least one holed hinging portion 25 extends. The fixing base 24 is fixed inside a locking groove 26 formed in the second hinge part 16. The holed hinging portion 25 extends inside the housing seat 20 so that it may be coupled with the articulation piece 18 and define a hinging seat 27 (see FIGS. 2, 4, 9, 14, 20 and 34).

As shown in FIG. 3, the first hinge part 15 and the second hinge part 16 are pivotably joined together by means of a pivoting screw 21 which engages the hinging seat 27.

In accordance with the invention, the fixing base 24 of the reinforcing element 23 is fixed inside the locking groove 26 by means of a form-fit joint.

In this way, the front piece 12 and the side arms 13 of the frame 10 are fixed together. Moreover, by means of the hinge structure 14, it is possible to articulate the side arms 13 of the frame relative to the front piece 12.

Figure 5:
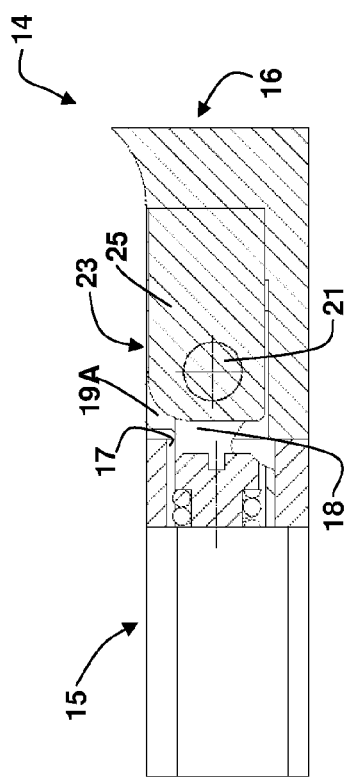
FIG. 5 shows a cross-sectional view of the detail shown in FIG. 4 along the plane indicated by the line V-V in FIG. 4.
Figure 4:
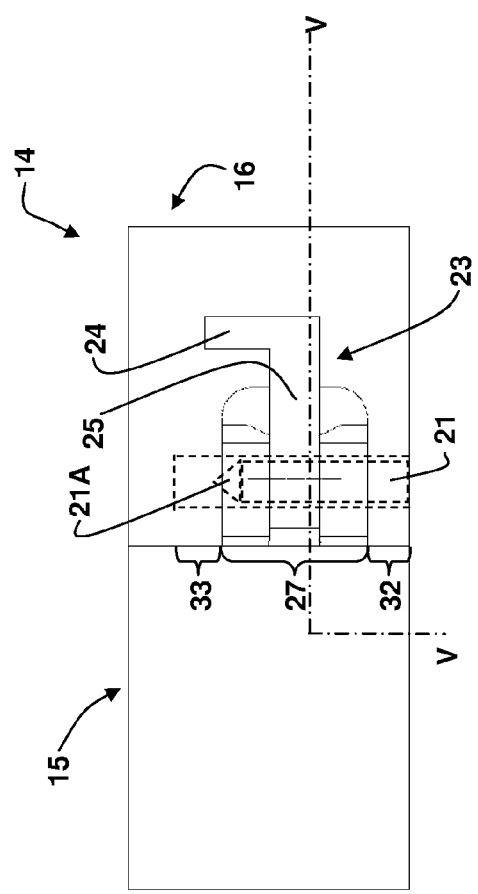
FIG. 4 shows a view, on a larger scale, of a detail of the frame shown in FIG. 3.
Figure 7:
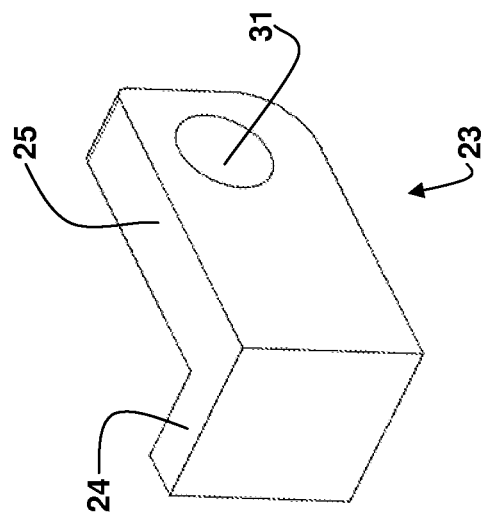
FIG. 7 shows a view, similar to that of FIG. 6, but taken from a different perspective.
Figure 6:
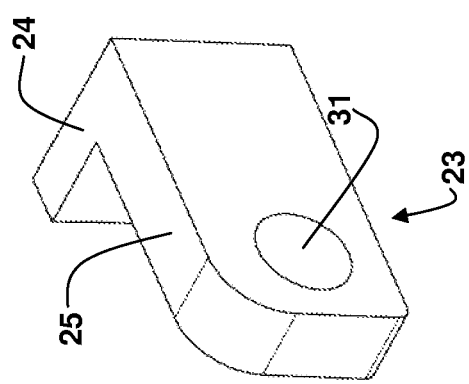
FIG. 6 shows a perspective view of a component of the frame shown in FIG. 3.
Figure 8:
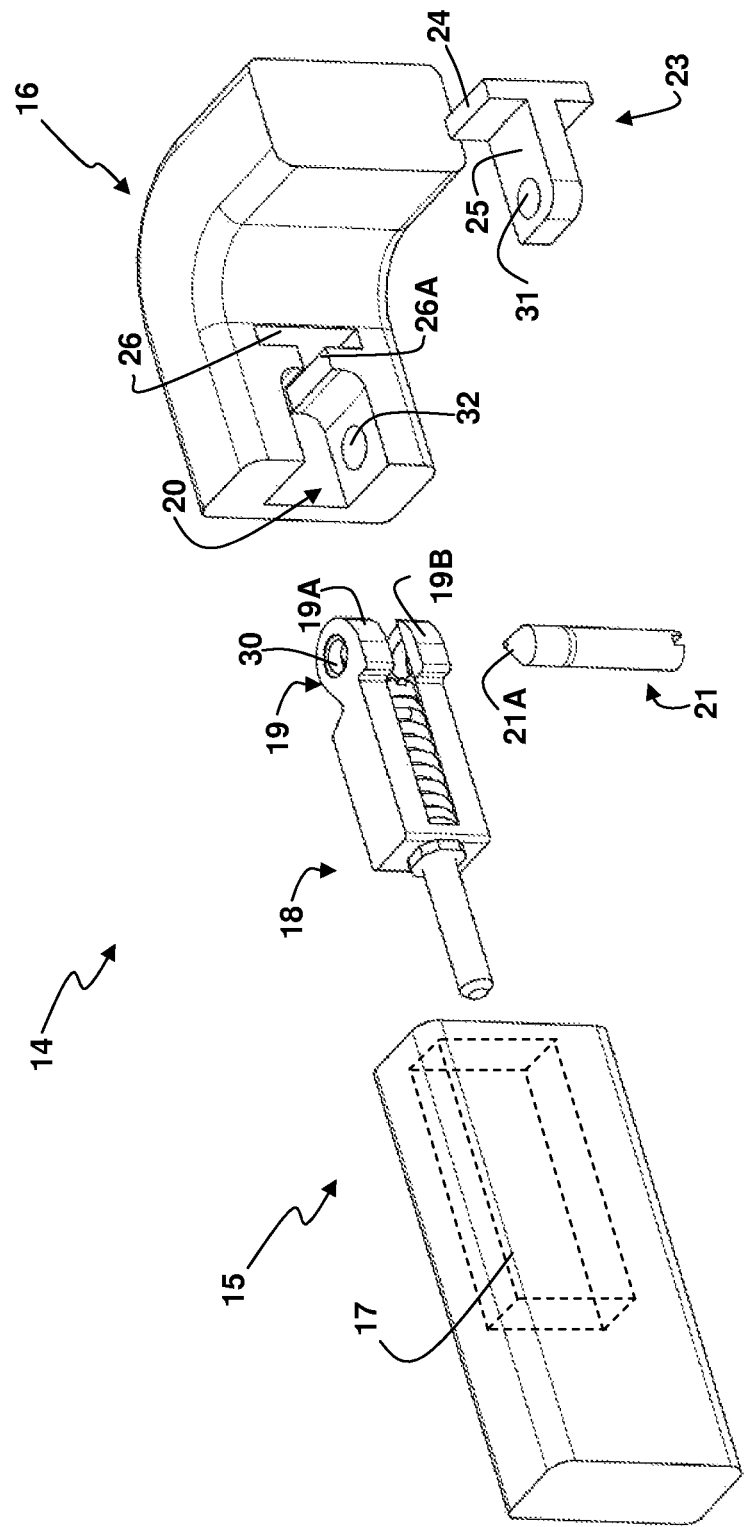
FIG. 8 shows an exploded view of a detail of a second embodiment of a frame according to the invention.
Figure 12:
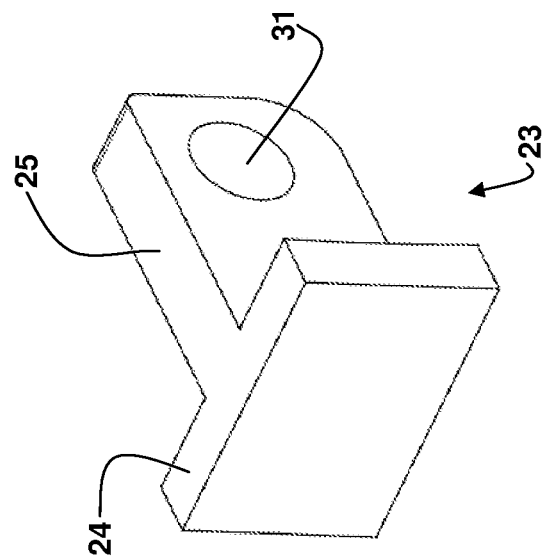
FIG. 12 shows a view, similar to that of FIG. 11, but taken from a different perspective.
Figure 11:
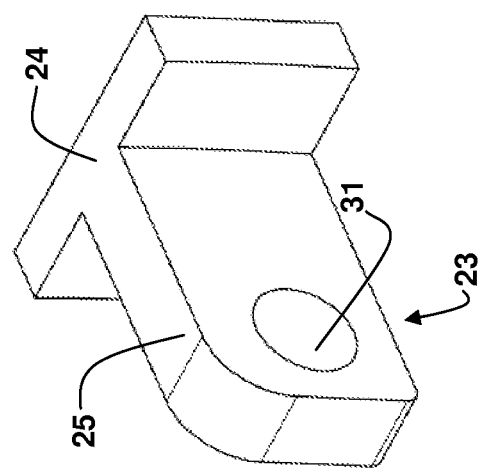
FIG. 11 shows a perspective view of a component of the frame shown in FIG. 8.
Figure 13:
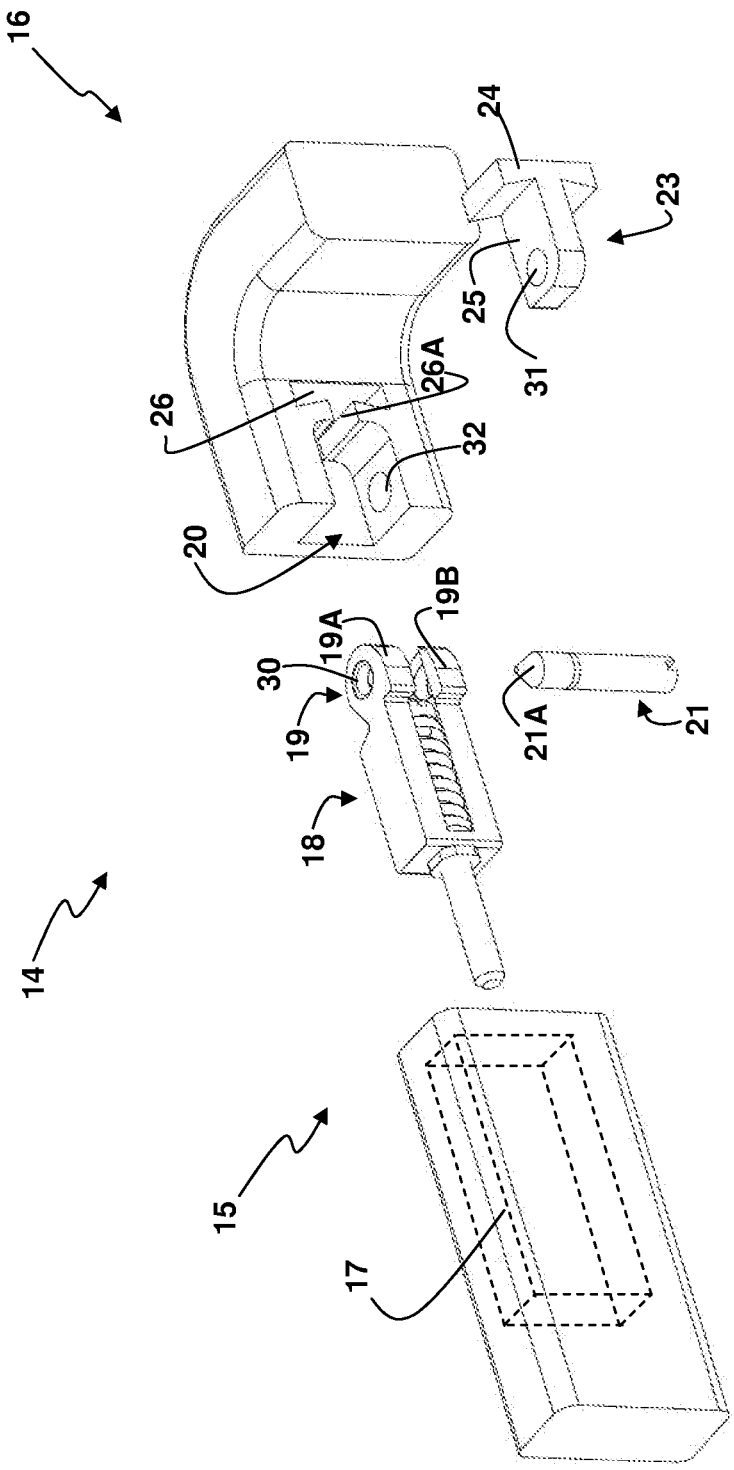
FIG. 13 shows an exploded view of a detail of a third embodiment of a frame according to the invention.
Figure 17:
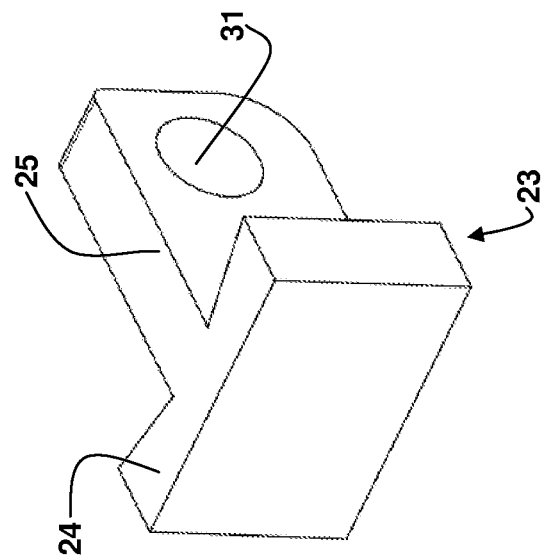
FIG. 17 shows a view, similar to that of FIG. 16, but taken from a different perspective.
Figure 16:
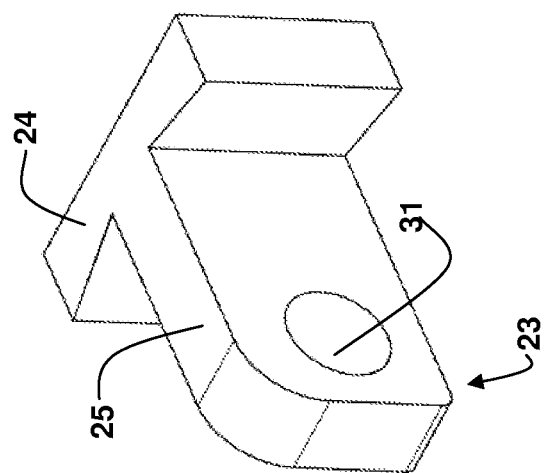
FIG. 16 shows a perspective view of a component of the frame shown in FIG. 13.

Preferably, the pivoting end 19 of the articulation piece 18 is defined by two holed lugs 19A and 19B which are parallel to each other. Each of these lugs 19A and 19B comprises a hinging through-hole 30 intended during use to receive the pivoting screw 21. As shown in the attached figures, the hinging portion 25 of the reinforcing element 23 may be provided with a pivoting though-hole 31 intended also to receive the pivoting screw 21. With reference to FIGS. 4, 5 and 20, once the holed hinging portion 25 is coupled with the articulation piece 18, the pivoting hole 31 is advantageously situated between the hinging holes 30 of the holed lugs 19A, 19B. In this way the hinging seat 27 is passed through along its entire length by a through-hole designed to receive the pivoting screw 21. This hole is obtained by the superimposed arrangement of the hinging holes 30 and the pivoting hole 31.

Preferably, the pivoting screw 21 is provided with a thread so as to be able to be screwed during use at least inside a hinging hole 30 of the articulation piece 18 and/or inside the pivoting hole 31 of the hinging portion 25.

Advantageously, in the case where only the hinging hole 31 is threaded, a single articulation piece 18 may be used for the right-hand and left-hand side arm of the frame, without adversely affecting the strength of the frame. Alternatively, only the hinging hole situated relatively further from the pivoting hole 31 may be threaded.

As schematically shown in FIG. 4, the pivoting screw 21 preferably engages during use the hinging seat 27 and two opposite surfaces of the housing seat 20 formed in the second hinge part 16.

In accordance with that schematically shown in FIG. 4 and FIG. 20, these opposite surfaces may be provided respectively with a first engaging hole 32 and a second engaging hole 33. The first engaging hole 32 is a through-hole and is designed to receive the head of the pivoting screw 21. The second engaging hole 33 preferably is not a through-hole and is designed to receive, at least partially, the end part 21A of the shank of the pivoting screw 21.

Figure 18:
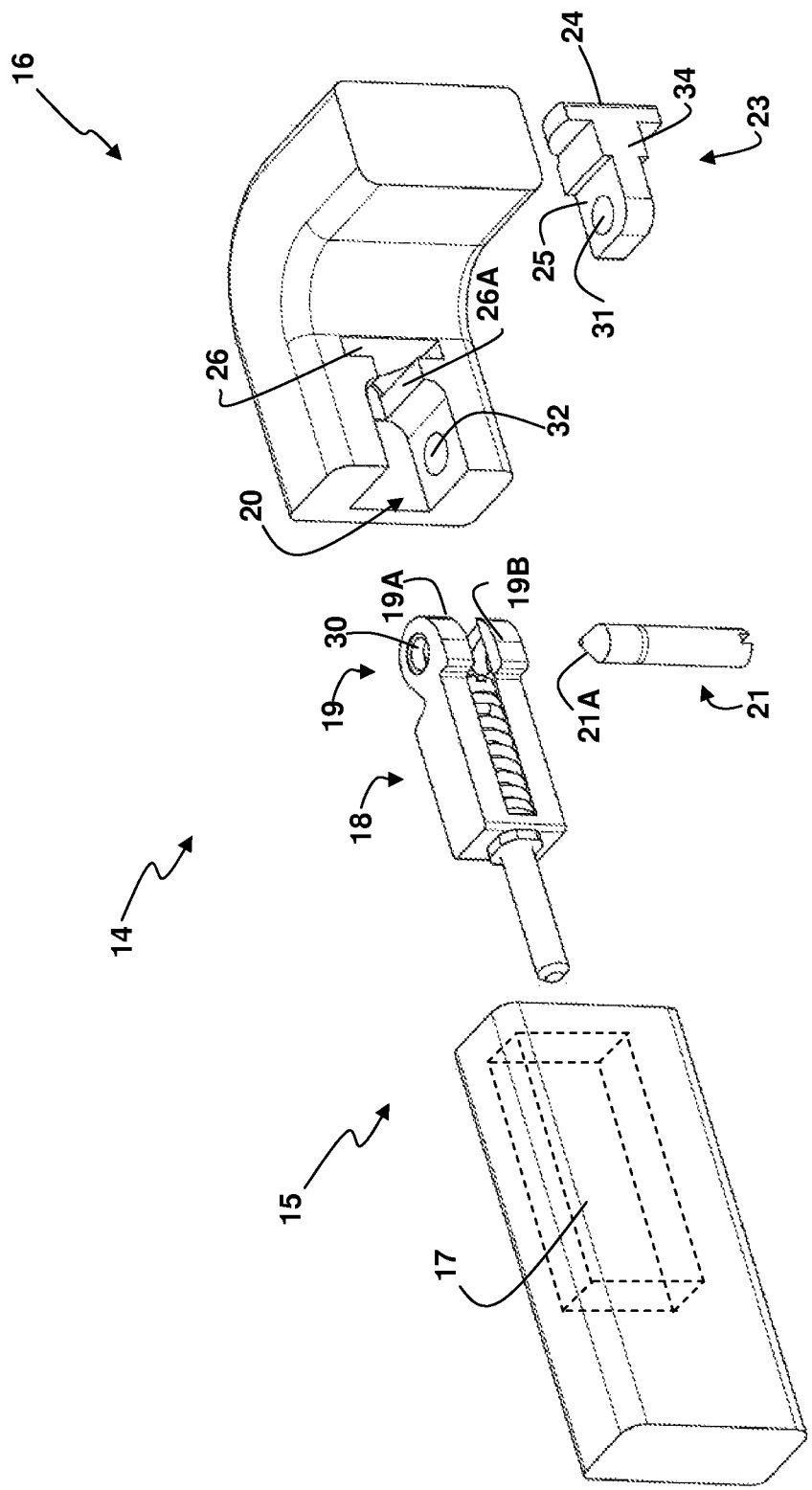
FIG. 18 shows an exploded view of a detail of a fourth embodiment of a frame according to the invention.
Figure 18A:
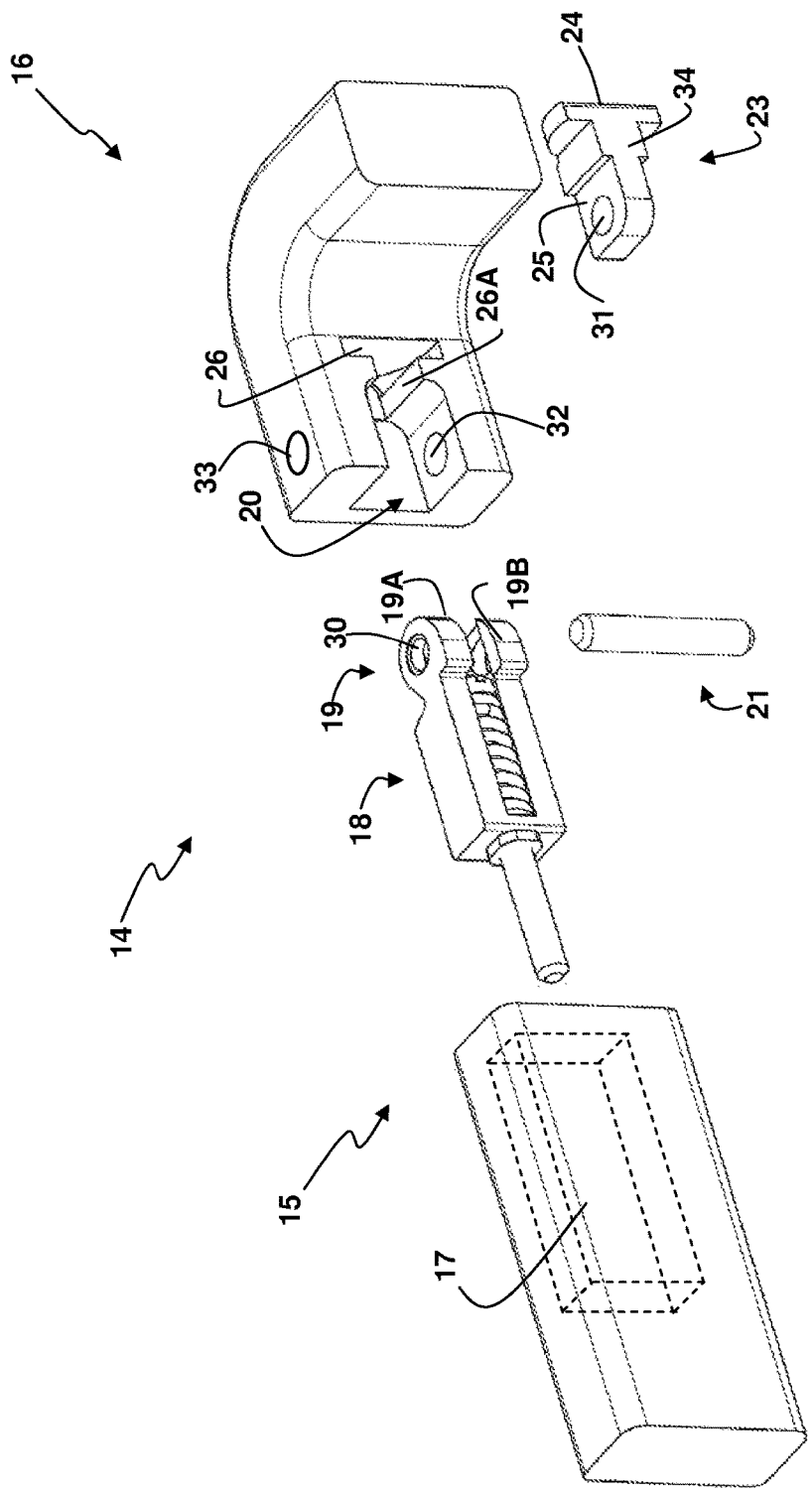
FIG. 18A shows a variant of the embodiment shown in FIG. 18.

According to an alternative embodiment, shown in FIG. 18A, the second engaging hole 33 is also a through-hole. In this case, advantageously, the pivoting screw 21 may be replaced by a threadless pin.

As mentioned above, the fixing base 24 of the reinforcing element 23 is fixed inside the locking groove 26 formed in the second hinge part 16 by means of a form-fit joint. In particular, the fixing base 24 is fixed inside the locking groove 26 by means of a form-fit joint of the male (fixing base) and female (locking groove) type.

Preferably, the joint formed between the fixing base 24 and the locking groove 26 has minimum interference. In this way, insertion of the fixing base 24 inside the locking groove 26 does not result in excessive deformation of the groove and may be performed without having to use specific tools. The locking groove 26 has in fact substantially the same shape and the same dimensions as the fixing base 24. This locking groove 26 may communicate with the housing seat 20 by means of a slot 26A.

As can be seen from the attached figures, via the slot 26A the hinging portion 25 extends from the fixing base 24 inside the housing seat 20.

In accordance with the embodiments shown in FIGS. 1-32 and 39-41, the fixing base 24 of the reinforcing element 23 lies in a plane substantially perpendicular to the plane in which the holed hinging portion 25 of the reinforcing element 23 lies.

In this way, on the basis of that described above, any tensile forces exerted by the pivoting end 19 of the articulation piece 18 and acting in a direction substantially parallel to the direction of extension of the holed portion 25 may be easily withstood by the fixing base 24.

In accordance with the embodiment shown in FIGS. 3-7, the reinforcing element 23 may be shaped with a substantially L-shaped profile, wherein the fixing base 24 is arranged along the side of the profile which has a smaller length.

In accordance with the embodiments shown in FIGS. 8-26, the reinforcing element 23 may be shaped with a substantially T-shaped profile, wherein the fixing base 24 is arranged at the head of the profile.

In accordance with the embodiment shown in FIGS. 13-17, the fixing base 24 of the reinforcing element 23 may be shaped with a substantially dovetail-shaped profile. In this way the contact surface area between the fixing base 24 and the locking groove 26 is maximized, further reinforcing, compared to the embodiments described above, the joint between the reinforcing element 23 and the second hinge part 16.

In accordance with the embodiment shown in FIGS. 18-26, the holed hinging portion 25 of the reinforcing element 23 has a shoulder surface 34. This shoulder surface 34 is designed to be, during use, in direct contact with the outer surfaces of the lugs 19A, 19B of the articulation piece 18 so as to define the end-of-travel stops for rotation of the pivoting end 19 of the articulation piece 18 about a longitudinal axis of the hinging seat 27. In particular, the function of the shoulder surface 34 is such as to ensure that the first hinge part 15 rotates with respect to the second hinge part 16 within a rotation range such as to prevent the side arm 13 of the frame 10 from striking against the front piece 12 and the associated lenses.

Figure 24:
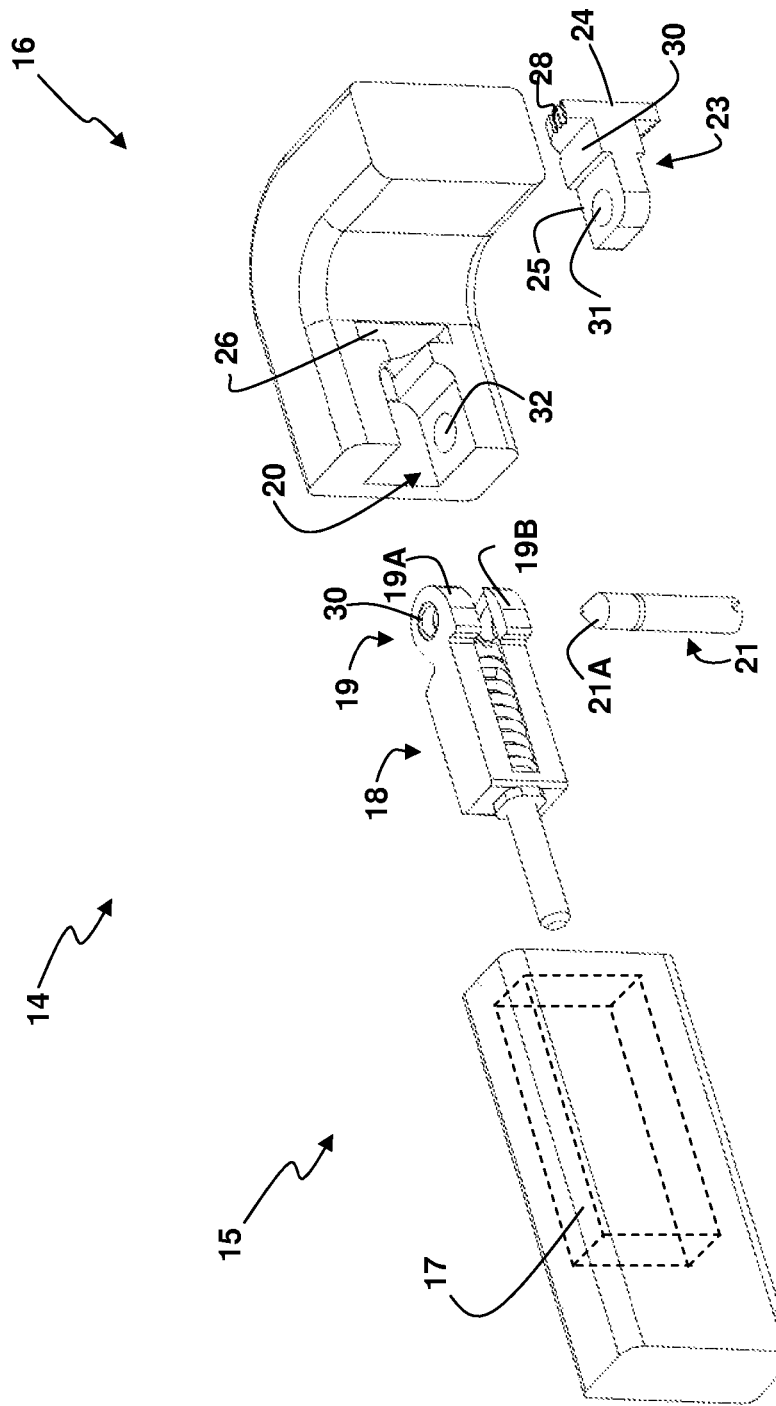
FIG. 24 shows an exploded view of a detail of a sixth embodiment of a frame according to the invention.
Figure 26:
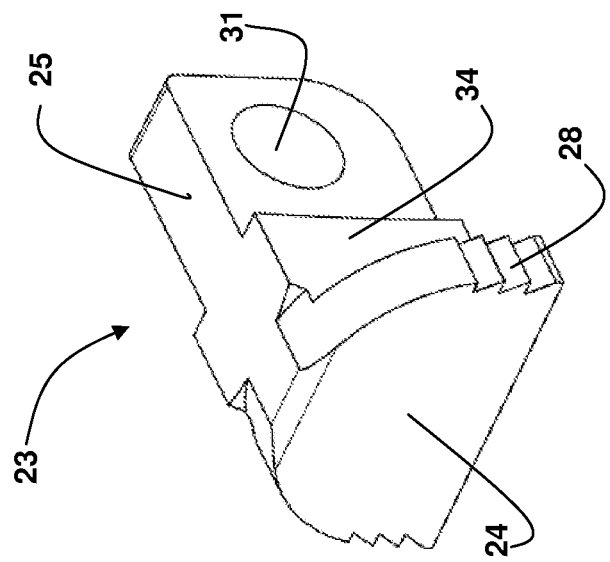
FIG. 26 shows a view, similar to that of FIG. 25, but taken from a different perspective.
Figure 25:
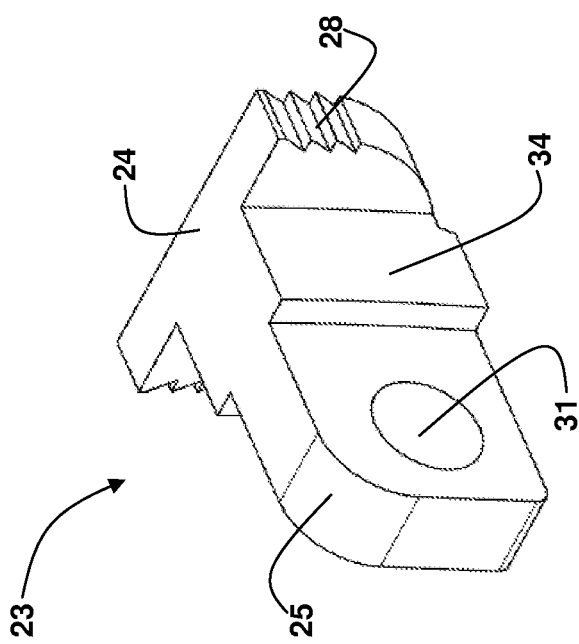
FIG. 25 shows a perspective view of a component of the frame shown in FIG. 24.

In accordance with the embodiment shown in FIGS. 24-26, the surfaces of the fixing base 24 of the reinforcing element 23, which during use are in direct contact with corresponding surfaces delimiting the locking groove 26, may be provided with gripping teeth 28 designed to increase the gripping force between the fixing base 24 and the locking groove 26.

Figure 27:
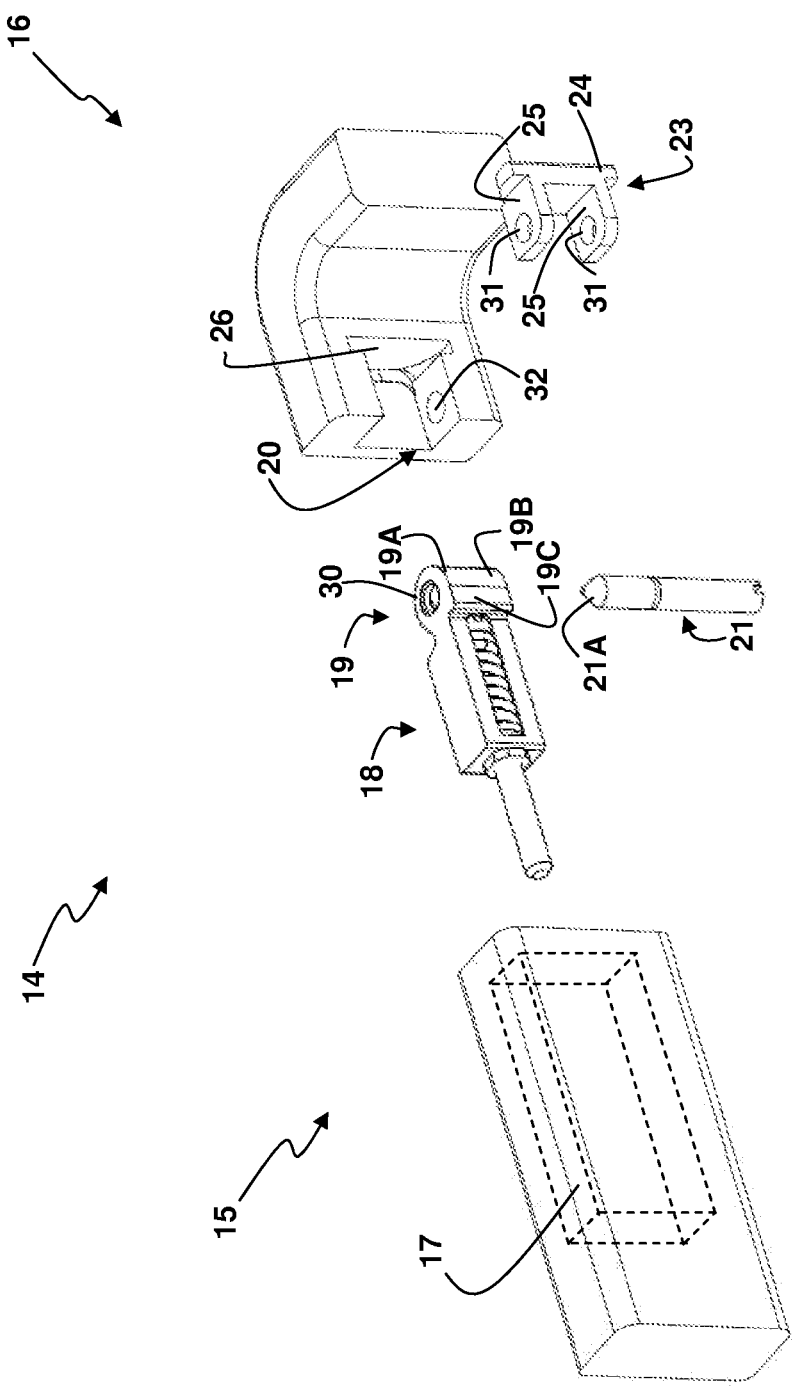
FIG. 27 shows an exploded view of a detail of a seventh embodiment of a frame according to the invention.
Figure 29:
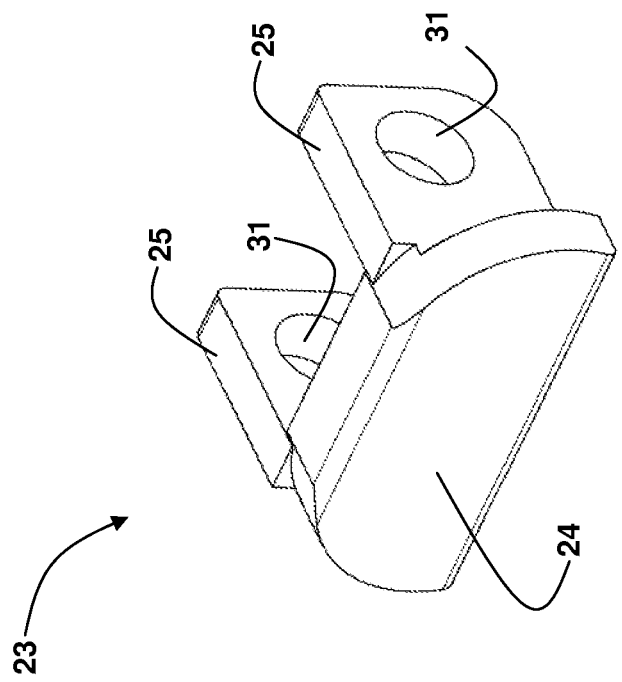
FIG. 29 shows a view, similar to that of FIG. 28, but taken from a different perspective.
Figure 28:
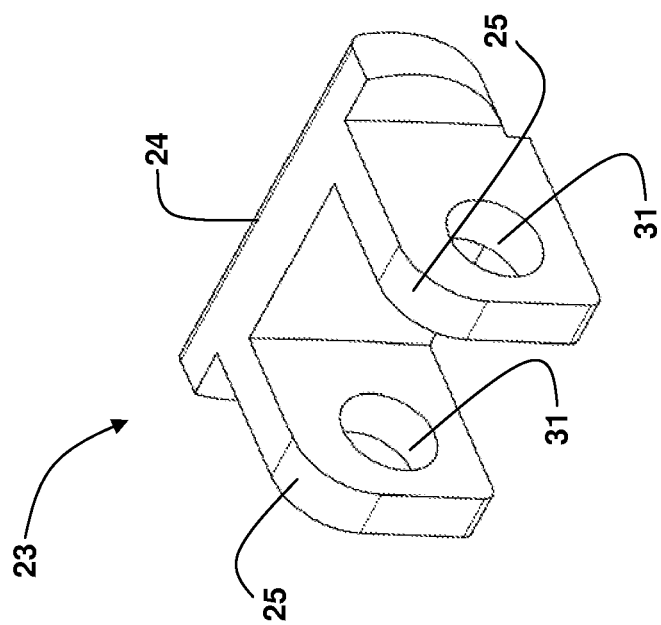
FIG. 28 shows a perspective view of a component of the frame shown in FIG. 27.

In accordance with the embodiment shown in FIGS. 27-29, the reinforcing element 23 has a fixing base from which two hinging portions 25, each provided with a pivoting hole 31, extend. Said hinging portions 25 are parallel to each other and extend in a direction substantially perpendicular to the fixing base 24.

The articulation piece 18 may be provided with a pivoting end 19 having two holed lugs 19A and 19B transversely connected by a joining surface 19C.

In this embodiment, once the articulation piece 18 is coupled with the reinforcing element 23, the pivoting end 19 of the articulation piece 18 will be received between the hinging portions 25 of the reinforcing element 23 so that the hinging holes 30 of each holed lug 19A, 19B are aligned with the pivoting holes 31 of the facing hinging portions 25, so as to be able to be engaged by the pivoting screw 21.

Figure 30:
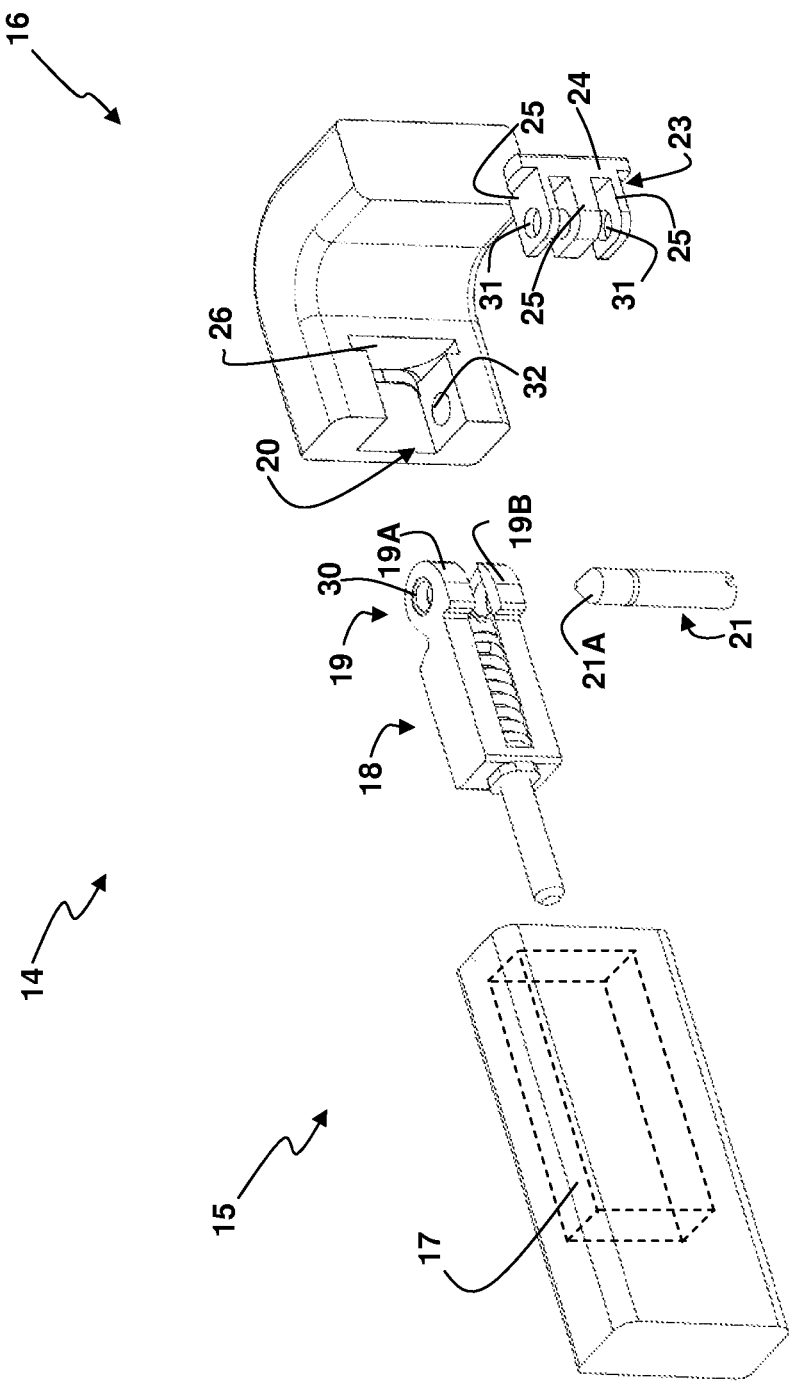
FIG. 30 shows an exploded view of a detail of an eighth embodiment of a frame according to the invention.
Figure 31:
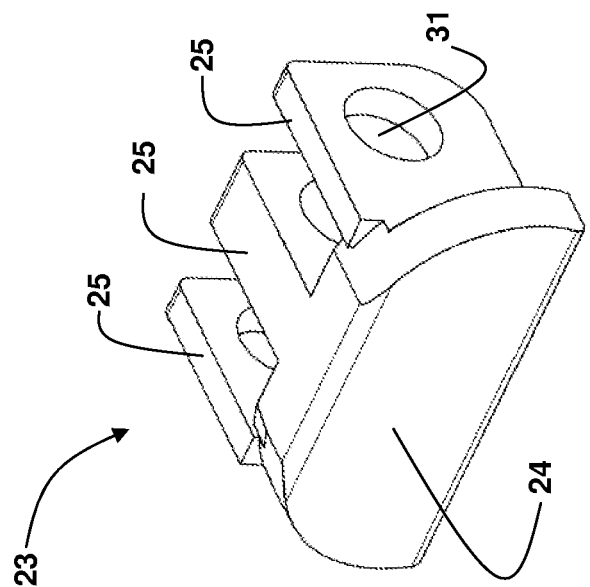
FIG. 31 shows a perspective view of a component of the frame shown in FIG. 30.
Figure 32:
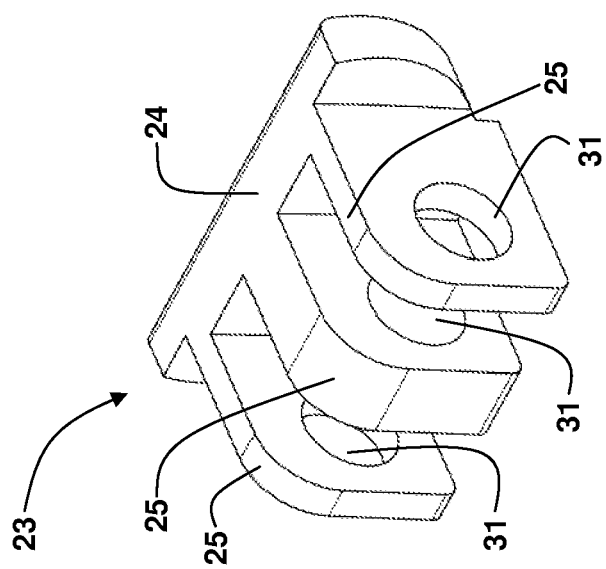
FIG. 32 shows a view, similar to that of FIG. 31, but taken from a different perspective.
Figure 33:
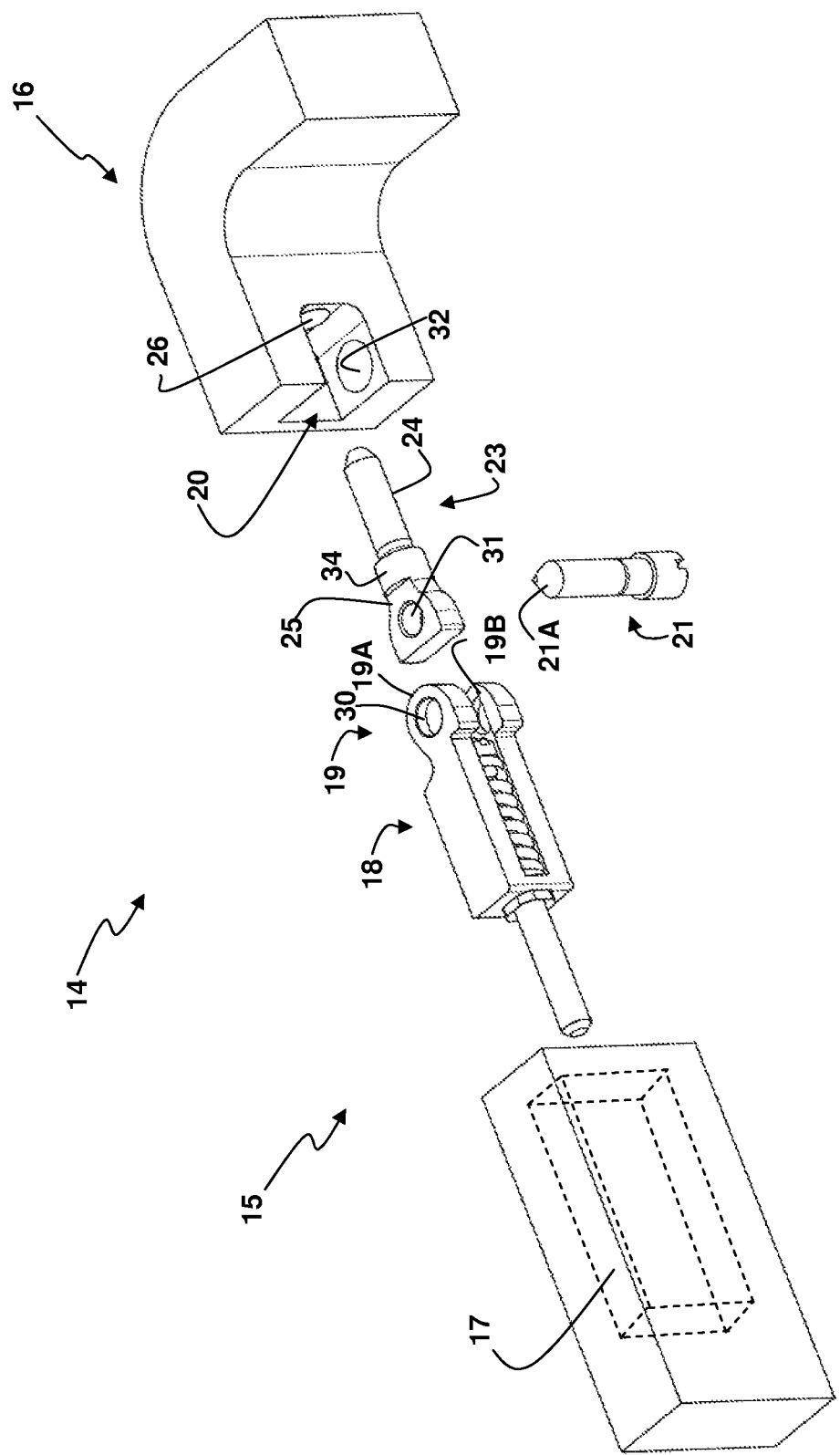
FIG. 33 shows an exploded view of a detail of a ninth embodiment of a frame according to the invention.
Figure 38:
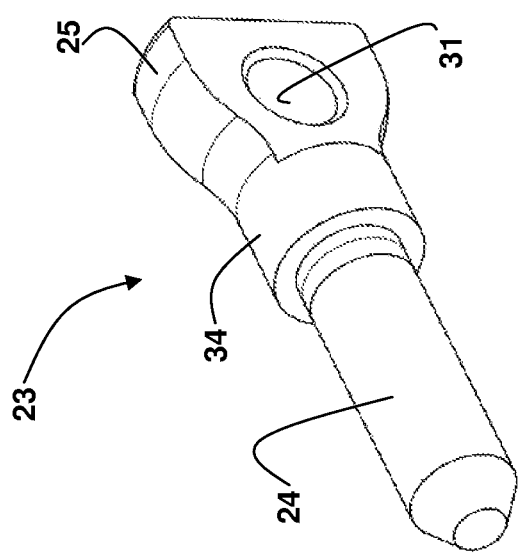
FIG. 38 shows a view, similar to that of FIG. 37, but taken from a different perspective.
Figure 37:
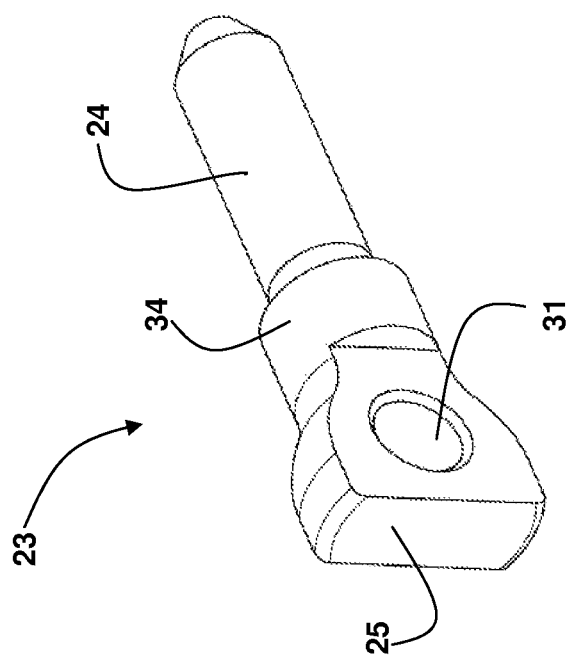
FIG. 37 shows a perspective view of a component of the frame shown in FIG. 33.

In accordance with the embodiment shown in FIGS. 30-32, the reinforcing element 23 has a fixing base 24 from which three hinging portions 25, each provided with a pivoting hole 31, extend. Said hinging portions 25 are parallel to each other and extend in a direction substantially perpendicular to the fixing base 24.

In this embodiment, the three hinging portions 25 define two hinging seats inside which, once the articulation piece 18 is coupled with the reinforcing element 23, the holed lugs 19A, 19B of the pivoting end 19 of the articulation piece 18 will be housed.

Once coupled together, the pivoting holes 31 of the hinging portions 25 will be aligned with the hinging holes 30 of the facing holed lugs 19A, 19B, such that they may be engaged by the pivoting screw 21.

In accordance with the embodiment shown in FIGS. 33-38, the fixing base 24 of the reinforcing element 23 and the locking groove 26 are provided with corresponding threads so that the fixing base 24 may be fixed by means of screwing inside the locking groove 26, thus forming a form-fit joint.

In this embodiment, the holed hinging portion 25 of the reinforcing element 23 is shaped with a ring-like profile. The fixing base 24 and the locking groove 26 are designed to allow the ring-like hinging portion 25, once the screwing operation has been completed, to be coupled with the holed lugs 19A, 19B of the pivoting end 19.

Advantageously, in this embodiment, in order to facilitate the operation of fixing the reinforcing element 23, the fixing base 24 extends along a direction substantially coinciding with the direction along which the holed hinging portion 25 extends.

It should be noted that this embodiment differs from the known solutions in that, although there is a direct coupling of the screw/female thread type between the insert 23 and the material forming the frame, this coupling is formed in a direction along which tensile/compressive stresses, and not shearing and bending stresses, mainly occur. Therefore, when the fixing base 24 is screwed directly into the second hinge part 16, the strength of the frame 10 is not adversely affected.

Advantageously, in a manner similar to that described with reference to the embodiment shown in FIGS. 18-26, the ring-type holed hinging portion 25 may have a shoulder surface 34. This shoulder surface 34 is designed during use to be in direct contact with the outer surfaces of the lugs 19A, 19B of the articulation piece 18 so as to define the end-of-travel stops for rotation of the pivoting end 19 of the articulation piece 18 about a longitudinal axis of the hinging seat 27.

Preferably, the frame 10 according to the invention is made of cellulose acetate. Advantageously, the locking groove 26 may be made during the milling operations carried out on the acetate starting sheet from which the frame is obtained, without any additional costs.

Advantageously, the locking groove 26 may be manufactured using the same tool path used to form the fixing base 24 of the reinforcing element 23.

The reinforcing element 23 is preferably made of metal and/or metal alloy.

In accordance with some of the embodiments shown, the first hinge part 15 may be provided on an end portion of the side arm 13 of the frame 10 and the second hinge part 16 may be provided on the facing end portion of the front piece 12.

In accordance with the embodiments shown, the first hinge part 15 and the second hinge part 16 may be formed as one piece respectively with the side arm 13 and the front piece 12 of the frame.

Figure 19:
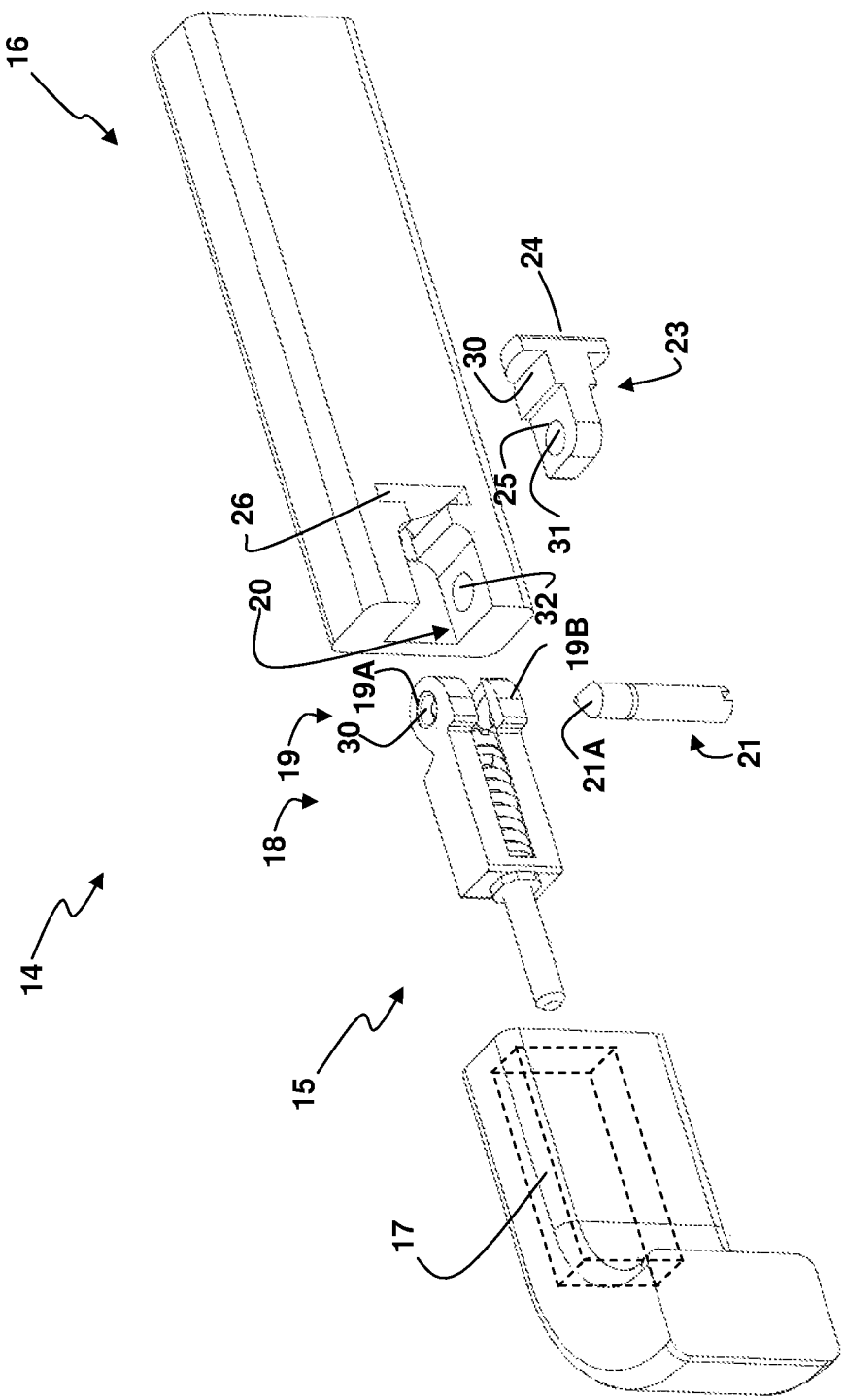
FIG. 19 shows an exploded view of a detail of a fifth embodiment of a frame according to the invention.
Figure 23:
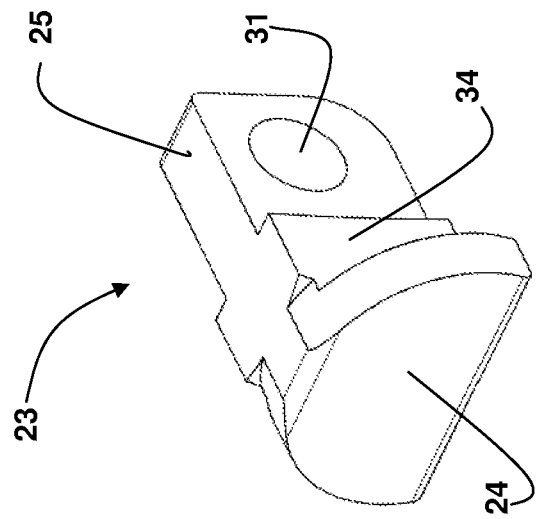
FIG. 23 shows a view, similar to that of FIG. 22, but taken from a different perspective.
Figure 22:
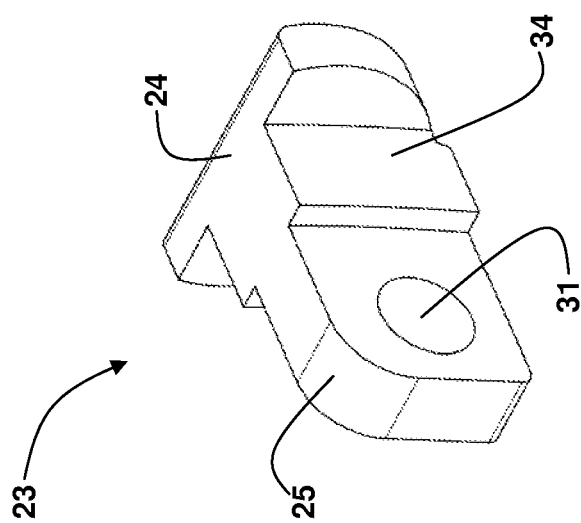
FIG. 22 shows a perspective view of a component of the frame shown in FIG. 18.

Alternatively, in accordance with the embodiment shown in FIG. 19, the first hinge part 15 may be provided on an end portion of the front piece 12 and the second hinge part 16 may be provided on the facing end portion of the side arm 13. In this embodiment also the first hinge part 15 and the second hinge part 16 may be formed as one piece with the side arm 13 and the front piece 12 of the frame, respectively.

Advantageously, the innovative principles of the present invention may be applied also to a frame provided with a non-flex hinge, i.e. a hinge in which the articulation piece 18 is rigidly fixed, and no longer in a slidable manner, inside a suitable seat formed in the side arm 13 or in the front piece 12 of the frame 10.

Figure 39:
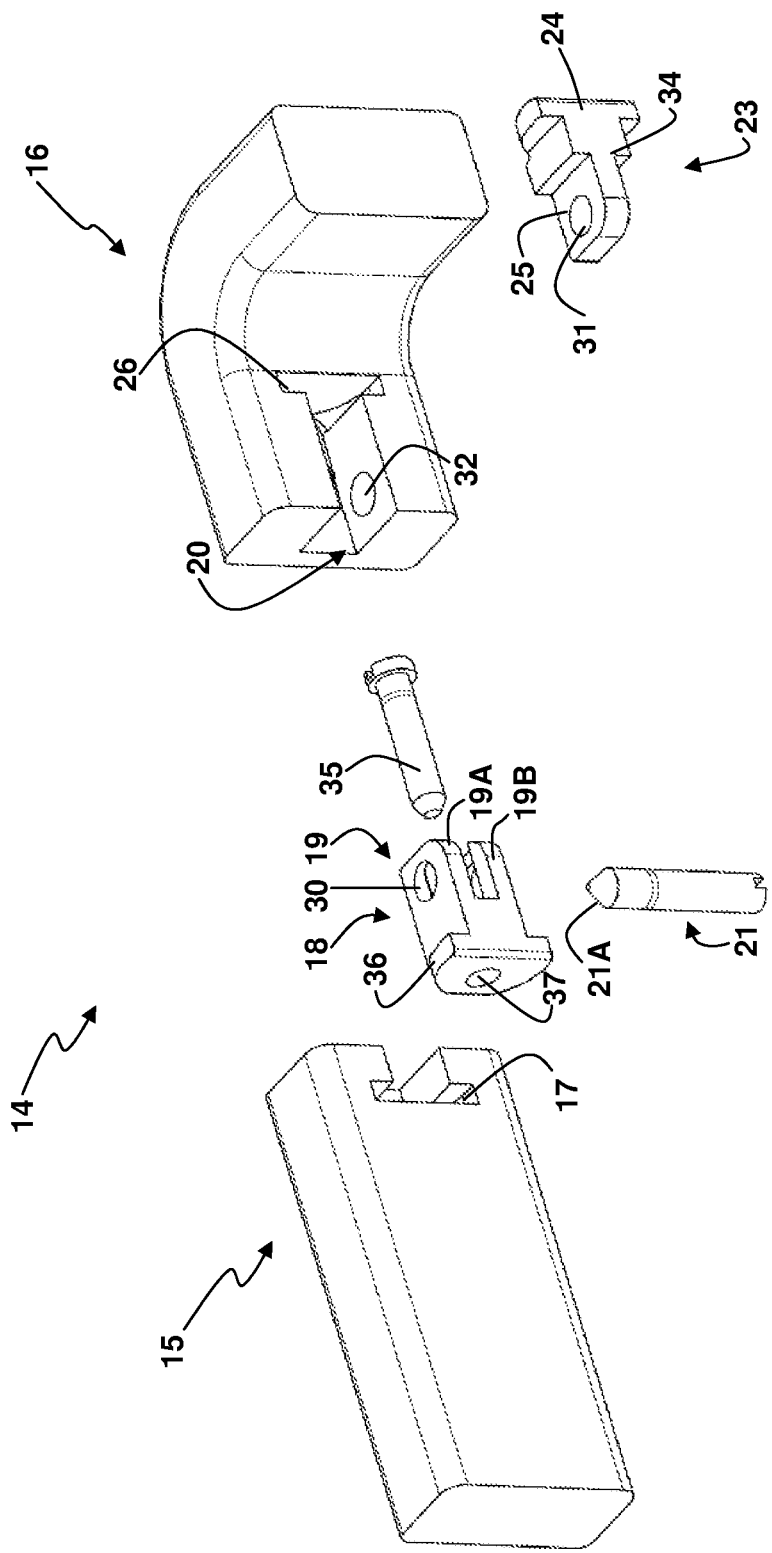
FIG. 39 shows an exploded view of a detail of a tenth embodiment of a frame according to the invention.
Figure 41:
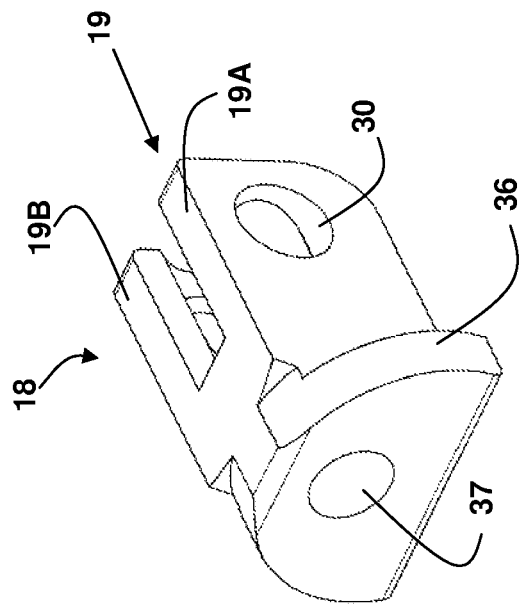
FIG. 41 shows a view, similar to that of FIG. 40, but taken from a different perspective.
Figure 40:
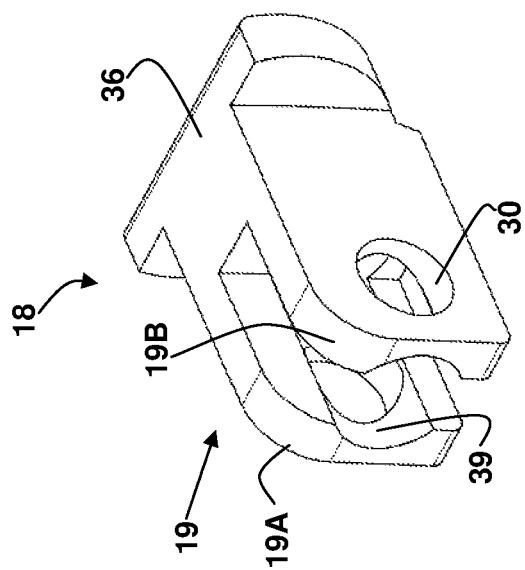
FIG. 40 shows a perspective view of a component of the frame shown in FIG. 39.

With specific reference to FIGS. 39-41, this embodiment of the frame 10 is provided with a hinge structure 14 which comprises a first hinge part 15 and a second hinge part 16. The first hinge part 15 comprises an articulation piece 18 with a fixing base 36 from which a pivoting end 19 extends. Said pivoting end 19 is defined by two holed lugs 19A, 19B each provided with a hinging hole 30.

The fixing base 36 is housed inside a cavity 17 provided in the first hinge part 15 and has a fixing hole 37. This fixing hole 37 is designed to be engaged by a locking screw 35 by means of which the articulation piece 18 is rigidly joined to the first hinge part 15.

The second hinge part 16 comprises in turn a housing seat 20 which houses the pivoting end 19 of the articulation piece 18.

In a manner similar to that described above, the frame 10 comprises a reinforcing element 23 having a fixing base 24 from which the holed hinging portion 25 extends. The fixing base 24 is fixed inside a locking groove 26 formed in the second hinge part 16. The holed hinging portion 25 extends inside the housing seat 20 so that it may be coupled with the articulation piece 18 and define a hinging seat 27.

In a manner similar to that described with reference to the frame provided with a flex hinge shown in FIGS. 1-38, the first hinge part 15 and the second hinge part 16 of the frame 10 shown in FIGS. 39-42 are engaged with each other by means of a pivoting screw 21 which engages the hinging seat 27.

In accordance with the innovative principles of the present invention, also in the case where the frame 10 is provided with a hinge of the non-flex type, the fixing base 24 of the reinforcing element 23 is fixed inside the locking groove 26 by means of a form-fit joint.

As shown in FIG. 40, the holed lugs 19A and 19B of the pivoting end 19 of the articulation piece 18 may have recesses 39 facing each other. These recesses 39 facilitate the insertion of the locking screw 35 inside the fixing hole 37.

In this embodiment also, direct screwing of the locking screw 35 into the material forming the frame is performed in a direction along which tensile/compressive stresses, and not shearing and bending stresses, mainly occur and therefore does not adversely affect the strength of the frame. Preferably the locking screw 35 is screwed inside a corresponding hole provided in the frame. This hole is not visible in the attached figures, but may be easily imagined by a person skilled in the art. Alternatively, the locking screw 35 may be of the self-tapping type.

Moreover, the surfaces of the fixing base 24 of the reinforcing element 23, which during use are in direct contact with corresponding surfaces delimiting the locking groove 26, may be provided with gripping teeth 28 designed to increase the gripping force between the fixing base 24 and the locking groove 26.

Finally, in this embodiment also, the holed hinging portion 25 of the reinforcing element 23 may have a shoulder surface 34. As described above, this shoulder surface 34 ensures that the first hinge part 15 rotates with respect to the second hinge part 16 within a rotational range such as to prevent the side arm 13 of the frame 10 from striking the front piece 12 and the associated lenses.

In the light of that stated above, the person skilled in the art will easily understand how the frame 10 according to the invention is able to overcome the drawbacks mentioned above with reference to the prior art.

In particular, as a result of the specific structure of the frame according to the invention, it is possible to improve significantly the resistance to the stresses exerted by the side arms of the frame, during opening and closing thereof, on the pivoting screw.

Moreover, in accordance with the embodiments of the attached figures, the pivoting screw is fixed inside holes formed in the metal structure of the end of the articulation piece and of the reinforcing element. As a result, the pivoting screw is no longer fixed in the polymer which forms the seat provided in the front piece and therefore a frame which is stronger and less subject to breakages due to fatigue is obtained.

Finally, the frame according to the invention is simple to manufacture and does not involve additional machining costs.

Insertion of the reinforcing insert inside its seat is achieved simply and may be performed manually without having to use specialized labour or specific machines.

Finally, the greatest advantage of the frame according to the invention is the significant improvement in the shearing and bending behaviour. As already mentioned above, the shearing and bending stress states have a particularly negative effect on the known frames which do not have reinforcing elements. In fact, these stress states are opposed exclusively by the polymer from which the frame is made, with the result that in the long run fissures may arise in the front piece of the frame and may give rise to breakages.

In the frame structure according to the invention, instead, the shearing and bending forces are opposed mainly by the base of the reinforcing element 23. This structure operates in optimum conditions since its cross-section is relatively larger compared to the known solutions. Moreover, this base manages easily to withstand the stresses also owing to the greater resistive cross-section of the polymer material which surrounds it and keeps it in position.

By way of conclusion, from the above description it is clear how the frame according to the invention has characteristic features such as to solve advantageously the problems and drawbacks of the frame according to the prior art. In particular, it is clear how the frame according to the invention is particularly advantageous in the case of frames made of cellulose acetate.

The person skilled in the art, in order to satisfy specific requirements, may make modifications to the embodiments described above and/or replace the parts described with equivalent parts, without thereby departing from the scope of the accompanying claims.

For example, the hinging portion of the reinforcing element may be defined by two parallel and vertically spaced lugs, while the articulation piece may have a single holed lug designed to be inserted between the two lugs of the reinforcing element.

The invention claimed is:

1. Frame for spectacles (10) comprising a front piece (12) and at least one side arm (13) which are hinged together by means of a hinge structure (14) with a first hinge part (15) and a second hinge part (16), wherein the first hinge part (15) comprises a cavity (17) which slidably houses an articulation piece (18) having a pivoting end (19) defined by at least one holed lug (19A, 19B) and wherein the second hinge part (16) comprises a housing seat (20) which houses the pivoting end (19) of the articulation piece (18); the first hinge part (15) and the second hinge part (16) being provided on end portions of the front piece (12) and the at least one side arm (13) facing each other, and wherein the second hinge part (16) comprises a reinforcing element (23) with a fixing base (24) from which at least one holed hinging portion (25) extends, the fixing base (24) being fixed inside a locking groove (26) formed in the second hinge part (16) and the holed hinging portion (25) extending inside the housing seat (20) and being coupled with the articulation piece (18) so as to define a hinging seat (27), the first hinge part (15) and the second hinge part (16) being pivotably joined together by means of a pivoting screw (21) which engages the hinging seat (27) and which has its ends housed inside engaging holes (32, 33) provided in opposite surfaces of the housing seat (20), the frame (10) being characterized in that the fixing base (24) of the reinforcing element (23) is fixed inside the locking groove (26) by means of a form-fit joint.

2. Frame (10) according to claim 1, wherein said fixing base (24) of the reinforcing element (23) lies in a plane substantially perpendicular to the plane in which the holed hinging portion (25) of the reinforcing element (23) lies.

3. Frame (10) according to claim 1, wherein the reinforcing element (23) is made of metallic material and wherein the frame (10) is made of polymer material.

4. Frame (10) according to claim 3, wherein the reinforcing element (23) is made of cellulose acetate.

5. Frame (10) according to claim 1, wherein the surfaces of the fixing base (24), which are designed to come into contact with corresponding surfaces delimiting the locking groove (26), are provided with gripping teeth (28) designed to increase the gripping force between the fixing base (24) and the locking groove (26).

6. Frame (10) according to claim 1, wherein the holed hinging portion (25) comprises a shoulder surface (34) designed to come into direct contact with outer surfaces of the lugs (19A; 19B) of the articulation piece (18) so as to define the end-of-travel stops for rotation of the pivoting end (19) of the articulation piece (18) about a longitudinal axis of the hinging seat (27).

7. Frame (10) according to claim 1, wherein the fixing base (24) of the reinforcing element (23) and the locking groove (26) are provided with corresponding threads, the fixing base (24) being designed to be screwed into the locking groove (26).

8. Frame (10) according to claim 7, wherein the fixing base (24) of the reinforcing element (23) extends in a direction substantially coinciding with the direction in which the holed hinging portion (25) of the reinforcing element (23) extends.

9. Frame (10) according to claim 1, wherein the first hinge part (15) is provided on an end portion of the at least one side arm (13) and the second hinge part (16) is provided on an end portion of the front piece (12).

10. Frame (10) according to claim 9, wherein the first hinge part (15) and the second hinge part (16) are formed as one piece respectively with the at least one side arm (13) and the front piece (12) of the frame (10).

11. Frame (10) according to claim 1, wherein the locking groove (26) communicates with the housing seat (20) by means of a slot (26A); the hinging portion (25) extending from the fixing base (24) inside the housing seat (20) via this slot (26A).

12. Frame for spectacles (10) comprising a front piece (12) and at least one side arm (13) which are hinged together by means of a hinge structure (14) with a first hinge part (15) and a second hinge part (16), the first hinge part (15) comprising an articulation piece (18) with a fixing base (36) rigidly joined to the first hinge part (15) from which a pivoting end (19) defined by two holed lugs (19A, 19B) extends, the second hinge part (16) comprising a housing seat (20) which houses the pivoting end (19) of the articulation piece (18); the first hinge part (15) and the second hinge part (16) being provided on end portions of the front piece (12) and the at least one side arm (13) facing each other, and wherein the second hinge part (16) comprises a reinforcing element (23) with a fixing base (24) from which at least one holed hinging portion (25) extends, the fixing base (24) being fixed inside a locking groove (26) formed in the second hinge part (16) and the holed hinging portion (25) extending inside the housing seat (20) and being coupled with the articulation piece (18) so as to define a hinging seat (27), the first hinge part (15) and the second hinge part (16) being pivotably joined together by means of a pivoting screw (21) which engages the hinging seat (27) and which has its ends housed inside engaging holes (32, 33) provided in opposite surfaces of the housing seat (20), the frame (10) being characterized in that the fixing base (36) of the articulation piece (18) is housed inside a cavity (17) provided in the first hinge part (15) and has a fixing hole (37) designed to he engaged by a locking screw (35) by means of which the articulation piece (18) is rigidly joined to the first hinge part (15) and in that the fixing base (24) of the reinforcing element (23) is fixed inside the locking groove (26) by means of a form-fit joint.

* * * * *